US010645629B2

(12) United States Patent
Aminaka

(10) Patent No.: US 10,645,629 B2
(45) Date of Patent: May 5, 2020

(54) RELAY STATION APPARATUS, MOBILE COMMUNICATION SYSTEM, BASE STATION APPARATUS, AND METHOD FOR CONTROLLING RELAY STATION

(71) Applicant: NEC CORPORATION, Tokyo (JP)

(72) Inventor: Hiroaki Aminaka, Tokyo (JP)

(73) Assignee: NEC CORPORATION, Minato-ku, Tokyo (JP)

(*) Notice: Subject to any disclaimer, the term of this patent is extended or adjusted under 35 U.S.C. 154(b) by 254 days.

(21) Appl. No.: 14/886,894

(22) Filed: Oct. 19, 2015

(65) Prior Publication Data
US 2016/0044573 A1 Feb. 11, 2016

Related U.S. Application Data

(62) Division of application No. 13/813,855, filed as application No. PCT/JP2011/002708 on May 16, 2011, now abandoned.

(30) Foreign Application Priority Data

Aug. 3, 2010 (JP) .................................. 2010-174455

(51) Int. Cl.
H04W 40/22 (2009.01)
H04B 7/155 (2006.01)
(Continued)

(52) U.S. Cl.
CPC .............. H04W 40/22 (2013.01); H04B 7/14 (2013.01); H04B 7/155 (2013.01);
(Continued)

(58) Field of Classification Search
None
See application file for complete search history.

(56) References Cited

U.S. PATENT DOCUMENTS 4,906,085 A 3/1990 Sugihara et al.
9,185,717 B2 11/2015 Yu et al.
(Continued)

FOREIGN PATENT DOCUMENTS

CN 1601948 A 3/2005
CN 101170342 A 4/2008
(Continued)

OTHER PUBLICATIONS

Communication dated Jul. 18, 2016, from the United States Patent and Trademark Office in counterpart U.S. Appl. No. 14/660,305.
(Continued)

Primary Examiner — Adnan Baig
(74) Attorney, Agent, or Firm — Sughrue Mion, PLLC

(57) ABSTRACT

A mobile communication system includes at least one upper radio station (1) and a relay station (2). The relay station (2) performs a radio relay between a lower radio station (3) and the upper radio station (1). The relay station (2) is configured to attach, when an attaching to a first upper radio station included in attaching configuration information indicating an upper radio station to which the relay station (2) should attach is unsuccessful, to a second upper radio station different from the first upper radio station, and to notify a network (4 and 5) of notification information via the second upper radio station, the notification information indicating that the attaching to the first upper radio station is unsuccessful.

10 Claims, 21 Drawing Sheets

(51) Int. Cl.
| | |
|---|---|
| *H04W 24/04* | (2009.01) |
| *H04W 76/27* | (2018.01) |
| *H04W 76/10* | (2018.01) |
| *H04W 60/00* | (2009.01) |
| *H04B 7/14* | (2006.01) |
| *H04L 12/24* | (2006.01) |
| *H04W 36/08* | (2009.01) |
| *H04W 40/24* | (2009.01) |
| *H04W 84/04* | (2009.01) |

(52) U.S. Cl.
CPC ...... *H04L 41/0806* (2013.01); *H04L 41/0816* (2013.01); *H04W 24/04* (2013.01); *H04W 60/00* (2013.01); *H04W 76/10* (2018.02); *H04W 76/27* (2018.02); *H04W 36/08* (2013.01); *H04W 40/24* (2013.01); *H04W 84/047* (2013.01); *Y02D 70/1242* (2018.01); *Y02D 70/1262* (2018.01); *Y02D 70/1264* (2018.01); *Y02D 70/39* (2018.01); *Y02D 70/446* (2018.01)

(56) References Cited

U.S. PATENT DOCUMENTS

| | | | |
|---|---|---|---|
| 2002/0036995 | A1 | 3/2002 | Dalsgaard |
| 2004/0005887 | A1 | 1/2004 | Bahrenburg et al. |
| 2008/0014946 | A1 | 1/2008 | Kubota |
| 2009/0181694 | A1 | 7/2009 | Byun et al. |
| 2009/0190521 | A1 | 7/2009 | Horn et al. |
| 2010/0046400 | A1 | 2/2010 | Wu et al. |
| 2010/0103857 | A1 | 4/2010 | Ulupinar et al. |
| 2010/0157845 | A1 | 6/2010 | Womack et al. |
| 2010/0165910 | A1 | 7/2010 | Mathews et al. |
| 2010/0234026 | A1 | 9/2010 | Tenny et al. |
| 2010/0260109 | A1* | 10/2010 | Ulupinar ............ H04L 12/4633 370/328 |
| 2010/0322148 | A1 | 12/2010 | Liu et al. |
| 2011/0003545 | A1 | 1/2011 | Vainikka et al. |
| 2011/0051654 | A1 | 3/2011 | Blankenship et al. |
| 2011/0051655 | A1 | 3/2011 | Blankenship et al. |
| 2011/0124312 | A1 | 5/2011 | Kwon et al. |
| 2011/0208842 | A1* | 8/2011 | Mildh .................... H04B 7/155 709/220 |
| 2012/0002594 | A1 | 1/2012 | Rácz et al. |
| 2012/0039299 | A1 | 2/2012 | Teyeb et al. |
| 2012/0099515 | A1 | 4/2012 | Chen et al. |
| 2012/0142336 | A1 | 6/2012 | Van Phan et al. |
| 2012/0243461 | A1 | 9/2012 | Bucknell et al. |
| 2012/0314567 | A1 | 12/2012 | Seo et al. |
| 2013/0028139 | A1* | 1/2013 | Sanneck ............ H04L 41/0803 370/254 |
| 2013/0109399 | A1* | 5/2013 | Waz-Ambrozewicz ..................... H04B 7/0695 455/452.1 |
| 2013/0182555 | A1 | 7/2013 | Raaf et al. |

FOREIGN PATENT DOCUMENTS

| | | |
|---|---|---|
| CN | 100477849 C | 4/2009 |
| CN | 101523951 A | 9/2009 |
| CN | 101626565 A | 1/2010 |
| CN | 101657028 A | 2/2010 |
| CN | 101730032 A | 6/2010 |
| CN | 101742671 A | 6/2010 |
| JP | 2004-517582 A | 6/2004 |
| JP | 2009-539323 A | 11/2009 |
| JP | 2010-056857 A | 3/2010 |
| KR | 10-2007-0042101 A | 4/2007 |
| KR | 10-2008-0042549 A | 5/2008 |
| RU | 2181229 C1 | 4/2002 |
| RU | 2233045 C2 | 7/2004 |
| RU | 2236767 C2 | 9/2004 |
| RU | 2 300 839 C2 | 6/2007 |
| RU | 2 335 849 C2 | 10/2008 |
| RU | 2 355 129 C2 | 5/2009 |
| WO | 9923844 A2 | 5/1999 |
| WO | 0119121 A1 | 3/2001 |
| WO | 2009/050659 A2 | 4/2009 |
| WO | 2009/088937 A2 | 7/2009 |
| WO | 2009/109779 A1 | 9/2009 |
| WO | 2010/048571 A1 | 4/2010 |
| WO | 2010/057521 A1 | 5/2010 |

OTHER PUBLICATIONS

Communication dated Dec. 12, 2016, from the European Patent Office in counterpart European Application No. 11814222.3.
CATT "Selection of Donor Cell" 3GPP TSG RAN WG2 Meeting #69; San Francisco, US, Feb. 22-26, 2009; R2-101098; (2 pages total).
Institute for Information Industry (III), Coiler Corporation "Access control during RN attach procedure" 3GPP TSG-RAN WG2 #69; Feb. 22-26, 2010 San Francisco, USA; R2-101168 (6 pages total).
ZTE "Considerations on Other Re-establishment Causes for Relay" 3GPP TSG-RAN WG2 #70bis; Stockholm, Sweden, Jun. 28-Jul. 2, 2010; R2-103733 (3 pages total).
Huawei "Consideration on HO type choosing issue" 3GPP TSG-RAN WG3 AH; Jun. 29-Jul. 1, 2010; Beijing, P.R. China; R3-101867 (3 pages total).
An Office Action dated Feb. 7, 2017, which issued during the prosecution of U.S. Appl. No. 14/660,305.
Communication dated Apr. 19, 2017 issued by the Russian Federation Patent Office in counterpart application No. 2016134443/08 English Translation.
Communication dated Apr. 17, 2017 issued by the United States Patent and Trademark Office in U.S. Appl. No. 14/660,305.
"RN actions on detecting Radio Link Failure of Un," Institute for Information Industry (III), Apr. 6, 2010, Coiler Corporation, 3GPP TSG-RAN WG2#69b, R2-102232, (3 pages total) Internet <URL; http://www.3gpp.org/ftp/tsg_ran/WG2_RL2/TSGR2_69bis/Docs/R2-I 02232.zip>.
Communication dated Dec. 16, 2013, issued by the Korean Intellectual Property Office in corresponding Application No. 10-2013-7002502.
Communication dated Feb. 11, 2015 from the State Intellectual Property Office of the People's Republic of China in counterpart application No. 201180038224.6.
Communication dated Feb. 17, 2015, issued by the Russian Patent Office in corresponding application No. 2013109286.
Communication dated Jun. 17, 2015, issued by the United States Patent and Trademark Office in corresponding U.S. Appl. No. 13/813,855.
Communication dated Mar. 24, 2015 from the Japanese Patent Office in counterpart application No. 2012-527564.
Communication dated Oct. 22, 2014 from the Russian Federation Patent Office in counterpart application No. 2013109286/08(013805).
Institute for Information Industry (III), Coiler Corporation, RN actions on detecting Radio Link Failure of Un(online), 3GPP TSG-RAN WG2#69bis R2-102232, Internet <URL:http://www.3gpp.org/ftp/tsg_ram/WG2_RL2/TSGR2_69bis/Docs/R2-102232.zip>, Apr. 6, 2010.
Japanese Patent Abstract cited in Office Action for Japanese Patent Application No. 2010-198969 dated Nov. 19, 2013 issued by the Japanese Patent Office.
"3rd Generation Partnership Project; Technical Specification Group Radio Access Network; Evolved Universal Terrestrial Radio Access (E-UTRA); Relay architectures for E-UTRA (LTE-Advanced) (Release 9)", 3GPP TR 36.806 V9.0.0, Mar. 2010, p. 1-34.
"Consideration on RN configuration and OAM issues", Huawei, 3GPP TSG-RAN WG3 AH, R3-101866, Jun. 29-Jul. 1, 2010, pp. 1-2.
"RN node Plug and play", NEC, 3GPP TSG RAN2 Meeting #70, R2-103043, May 10-14, 2010, pp. 1-4.
"Initial Relay Configuration", Qualcomm Incorporated, 3GPP TSG-RAN WG3 Ad-Hoc, R3-101939, Jun. 29-Jul. 2, 2010, pp. 1-3.

(56) References Cited

OTHER PUBLICATIONS

"3rd Generation Partnership Project; Technical Specification Group Radio Access Network; Feasibility study for Further Advancements for E-UTRA (LTE-Advanced) (Release 9)", 3GPP TR 36.912 V9.2.0, Mar. 2010, pp. 1-61.

"Report of 3GPP TSG RAN WG2 meeting #69", ETSI MCC, R2-101951, Feb. 22-26, 2010, pp. 1-181.

Communication dated Aug. 30, 2016 from the Japanese Patent Office in counterpart application No. 2015-172695.

"Initial RN connection configuration," 3GPP TSG-RAN WG3 Meeting RAN3 ad Hoc; R3-101949; Beijing, China, Jun. 29-Jul. 1, 2010 (3 pages total).

"Detach procedure for relays," 3GPP TSG-RAN WG3 Ad-hoc Meeting; R3-101961; Beijing, China, Jun. 29-Jul. 1, 2010 (3 pages total).

Notice of Allowance dated Apr. 4, 2018, which issued during the prosecution of U.S. Appl. No. 14/660,305.

Communication dated Aug. 21, 2017 from the United States Patent and Trademark Office in counterpart U.S. Appl. No. 14/660,305.

Communication dated Oct. 2, 2018 from the Japanese Patent Office in counterpart application No. 2018-000056.

Qualcomm Incorporated, "Startup procedure for Relay Nodes," 3GPP TSG-RAN WG3 Ad-Hoc; R3-101944, Beijing, China, Jun. 29-Jul. 2, 2010; 5 pages total.

Communication dated Jul. 4, 2018, from the State Intellectual Property Office of People's Republic of China in counterpart Application No. 201610533592.2.

Communication dated Feb. 25, 2019, from the Russian Federal Service for Intellectual Property in counterpart Application No. 2018126478/08.

Decision to Grant dated May 22, 2018 issued by the Intellectual Property Office of Russian Federation in counterpart application No. 2017132437/08.

CATT, "Authentication during attach procedure of relay", 3GPP TSG RAN WG3 Meeting #65bis, R3-092246, Miyazaki, Japan, Oct. 12-15, 2009, pp. 1-4 (4 pages total).

ZTE, "Discussion of Multi-hop Relay", 3GPP TSG-RAN WG3 Meeting #65, R3-091899, Shenzhen, China, Aug. 24-28, 2009, pp. 1-5 (5 pages total).

Communication dated Oct. 23, 2019, from the Japanese Patent Office in counterpart application No. 2019-016711.

Communication dated Feb. 26, 2020, issued by the European Patent Office in application No. 18 165 793.3.

CMCC et al., "Relay Attach Procedure", 3GPP TSG RAN WG3 Meeting #66bis, Valencia, Spain, Jan. 18-22, 2010, R3-100314, pp. 1-5.

\* cited by examiner

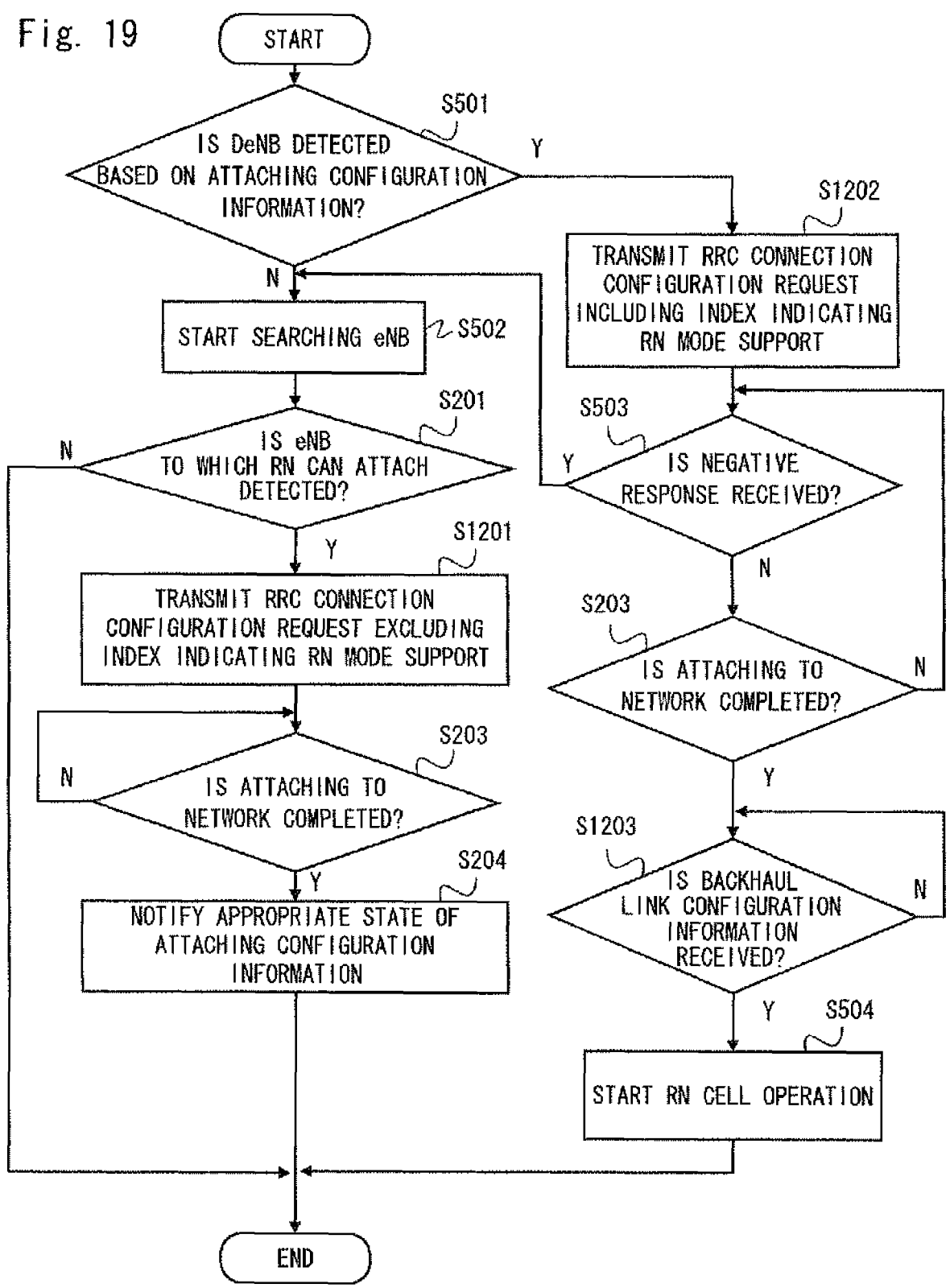

RELAY STATION APPARATUS, MOBILE COMMUNICATION SYSTEM, BASE STATION APPARATUS, AND METHOD FOR CONTROLLING RELAY STATION

CROSS REFERENCE TO RELATED APPLICATIONS

This is a divisional application based upon U.S. patent application Ser. No. 13/813,855 filed Feb. 1, 2013, which is a National Stage of International Application No. PCT/JP2011/002708 filed May 16, 2011, claiming priority based on Japanese Patent Application No. 2010-174455 filed Aug. 3, 2010, the contents of all of which are incorporated herein by reference in their entirety.

TECHNICAL FIELD

The present invention relates to a system including a base station and a relay station attaching to the base station.

BACKGROUND ART

In LTE-Advanced (Long Term Evolution Advanced) of 3GPP (3rd Generation Partnership Project), the introduction of relay stations (hereinafter "RNs (Relay Nodes)") is under review (see Non Patent Literature 1). The RN is one of techniques for increasing the communication speed of mobile stations (hereinafter "UEs (User Equipments)") located at cell edges and for increasing cell areas of base stations (hereinafter "eNBs (Evolved Node Bs)"), for example. The details of the RN architecture, which is under review in 3GPP, are disclosed in Non Patent Literature 2.

The outline of an RN system based on the RN architecture disclosed in Non Patent Literature 2 will be described below. FIG. 1 is a diagram showing a network configuration example when the RN of 3GPP is used. A base station (eNB) 1 belongs to a core network (hereinafter "CN") 4 of a mobile communication network operator. The CN4 includes a mobility management entity (hereinafter "MME") and a serving gateway (hereinafter "S-GW"). The eNB 1 generates an eNB cell 10 and relays traffic between a mobile station (UE) 3 and the CN4. A relay station (RN) 2 attaches to the eNB 1 by means of a backhaul link (BL1 in the figure). The UE 3 attaches to the eNB 1 or the RN 2 by means of an access link (AL1 or AL2 in the figure). The RN 2 attaches to the CN 4 through the backhaul link (BL1) with the eNB 1. The RN 2 generates an RN cell 20 and relays traffic between the UE 3 and the CN 4. An OAM server 5 manages the installation position of the eNB 1, and the cell information (use frequency, Physical Cell ID (PCI), and the like) of the eNB cell 10. The backhaul link and the access link will be explained later.

FIG. 2 is a diagram showing a sequence when an RN attaches to an eNB and a CN and starts an RN cell operation. The RN establishes a network connection in an operation (hereinafter "UE mode") similar to that of an existing UE upon initial start-up (step S1). Specifically, the RN configures a Radio Resource Control (hereinafter "RRC") connection with the eNB. When the process for the RN to attach to the eNB and the CN in the UE mode is completed, the RN transitions to an operation mode as a network node (hereinafter "RN mode"), and operates the RN cell. When the RN transitions to the RN mode, a method of controlling the backhaul link is also switched from the UE mode to the RN mode (step S2).

In a network introducing the RN, the eNB that supports the RN mode is referred to as "Donor eNB (hereinafter "DeNB")". Herein, only in the case of describing matters unique to the DeNB related to the connection with the RN, the term "DeNB" is used to be distinguished from a normal eNB. Further, herein, the UE (for example, UE 3-1 in FIG. 1) that attaches to the DeNB is referred to as "eNB-UE". On the other hand, the UE (for example, UE 3-2 in FIG. 1) that directly attaches to the RN is referred to as "RN-UE". Furthermore, in the case of describing matters common to the eNB-UE and the RN-UE, the term "UE" is simply used.

In a discussion about the RN in the 3GPP, there is a demand for supporting a multihop RN in the future. The multihop RN is a technique that makes it possible to connect an additional RN to an RN that attaches to a DeNB in a cascade configuration. Herein, in the case of describing the multihop, an RN that attaches to a lower layer of a DeNB with a radio interface is referred to as "upper RN", and an RN that attaches to a lower layer of the upper RN is referred to as "lower RN" so as to distinguish the RNs from each other. Additionally, herein, radio interfaces between a DeNB and an RN and between an upper RN and a lower RN are called "backhaul links". Meanwhile, radio interfaces between an eNB and an eNB-UE and between an RN and an RN-UE are called "access links".

Furthermore, in the discussion about the RN in the 3GPP, it is assumed that the RN holds, as attaching configuration information, cell information of a DeNB cell to which the RN can attach (see Non Patent Literature 3). The attaching configuration information includes information for designating a donor base station, a cell, or a sector to which the RN should attach. Specifically, the attaching configuration information includes a frequency of a DeNB cell and a Physical Cell ID (PCI), for example. The RN specifies the DeNB to which the RN should attach, based on the attaching configuration information.

CITATION LIST

Non Patent Literature

[Non Patent Literature 1] 3GPP TR36.912 V9.2.0 (2010-03), "Feasibility study for Further Advancements for E-UTRA (LTE-Advanced)"
[Non Patent Literature 2] 3GPP TR36.806 V9.0.0 (2010-03), "Relay architectures for E-UTRA (LTE-Advanced)"
[Non Patent Literature 3] 3GPP R2-101951 Report of 3GPP TSG RAN WG2 meeting #69, March, 2010

SUMMARY OF INVENTION

Technical Problem

The contents of the attaching configuration information to be held by the RN may be different for each RN depending on the installed location of the RN and the policy of a communication carrier. Accordingly, an operator has to set the attaching configuration information in consideration of the installed location of the RN and the policy of the communication carrier for each RN. These operations are actually difficult, and there is a problem of an increase in costs such as Capital Expenditure (CAPEX) and Operational Expenditure (OPEX).

The present invention has been made in view of the above-mentioned problems, and an object of the invention is to provide a mobile communication system, a relay station apparatus, a base station apparatus, a method for controlling a relay station, and a program, which contribute to simplification of setting of attaching configuration information in a system where a relay station (RN) attaches to a donor base station (DeNB) based on attaching configuration information.

Solution to Problem

In a first aspect of the present invention, a relay station apparatus includes a lower radio link communication unit, an upper radio link communication unit, and a control unit. The lower radio link communication unit is configured to perform radio communication with at least one lower radio station. The upper radio link communication unit is configured to perform radio communication with at least one upper radio station. The control unit is configured to attach, when an attaching to a first upper radio station included in attaching configuration information indicating an upper radio station to which the relay station apparatus should attach is unsuccessful, to a second upper radio station different from the first upper radio station, and to notify a network of notification information indicating that the attaching to the first upper radio station is unsuccessful.

In a second aspect of the present invention, a mobile communication system includes at least one upper radio station, and a relay station that performs a radio relay between a lower radio station and an upper radio station. The relay station is configured to attach, when an attaching to a first upper radio station included in attaching configuration information indicating an upper radio station to which the relay station should attach is unsuccessful, to a second upper radio station different from the first upper radio station, and to notify a network of notification information via the second upper radio station, the notification information indicating that the attaching to the first upper radio station is unsuccessful.

In a third aspect of the present invention, a base station apparatus includes a radio communication unit and a control unit. The radio communication unit is configured to perform radio communication with a mobile station and a relay station. The control unit controls communication with the relay station. When the base station apparatus does not correspond to an upper station preliminarily determined as a destination to which the relay station attaches, the control unit controls the radio communication unit to connect to the relay station by using a first connection mode in which the relay station operates as a mobile station. Further, when the base station apparatus corresponds to the upper station, the control unit controls the radio communication unit to connect to the relay station by using a second connection mode in which the relay station operates as a relay station.

In a fourth aspect of the present invention, a method for controlling a relay station that is wirelessly connectable to an upper radio station includes the following steps of:

(a) attaching, when an attaching to a first upper radio station included in attaching configuration information indicating an upper radio station to which the relay station should attach is unsuccessful, to a second upper radio station different from the first upper radio station; and (b) notifying a network of notification information via the second upper radio station, the notification information indicating that the attaching to the first upper radio station is unsuccessful.

In a fifth aspect of the present invention, a program causes a computer to execute the method according to the fourth aspect of the present invention described above.

In a sixth aspect of the present invention, a relay station apparatus includes a lower radio link communication unit, an upper radio link communication unit, and a control unit. The lower radio link communication unit is configured to perform radio communication with at least one lower radio station. The upper radio link communication unit is configured to perform radio communication with at least one upper radio station. The control unit is configured to determine whether attaching configuration information indicating an upper radio station to which the relay station apparatus should attach is held or not, and to attach to an upper radio station included in the attaching configuration information acquired from a network according to a result of the determination.

In a seventh aspect of the present invention, a mobile communication system includes at least one upper radio station, and a relay station that performs a radio relay between a lower radio station and an upper radio station. Here, the relay station is configured to determine whether attaching configuration information indicating an upper radio station to which the relay station should attach is held or not, and to attach to an upper radio station included in the attaching configuration information acquired from a network according to a result of the determination.

In an eighth aspect of the present invention, a method for controlling a relay station that is wirelessly connectable with an upper radio station includes the steps of:

(a) determining whether attaching configuration information indicating an upper radio station to which the relay station should attach is held or not; and (b) attaching to an upper radio station included in the attaching configuration information acquired from a network according to a result of the determination.

In a ninth aspect of the present invention, a program causes a computer to execute the method according to the eighth aspect of the present invention described above.

Advantageous Effects of Invention

According to the present invention, it is possible to provide a mobile communication system, a relay station apparatus, a base station apparatus, a method for controlling a relay station, and a program, which contribute to simplification of setting of attaching configuration information in a system in which a relay station (RN) attaches to a donor base station (DeNB) based on attaching configuration information.

BRIEF DESCRIPTION OF DRAWINGS

FIG. 19 is a flowchart of the relay station 2 in the fifth embodiment of the invention.

DESCRIPTION OF EMBODIMENTS

Figure 1:
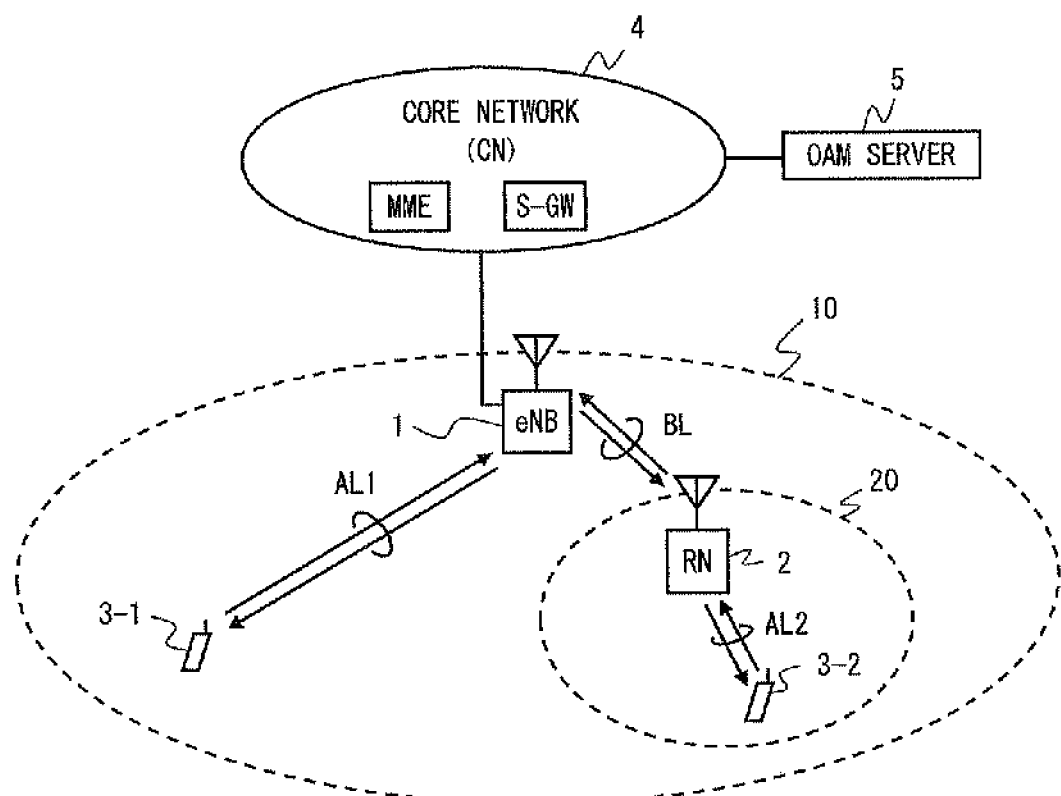
FIG. 1 is a block diagram showing a configuration of a typical mobile communication system.
Figure 2:
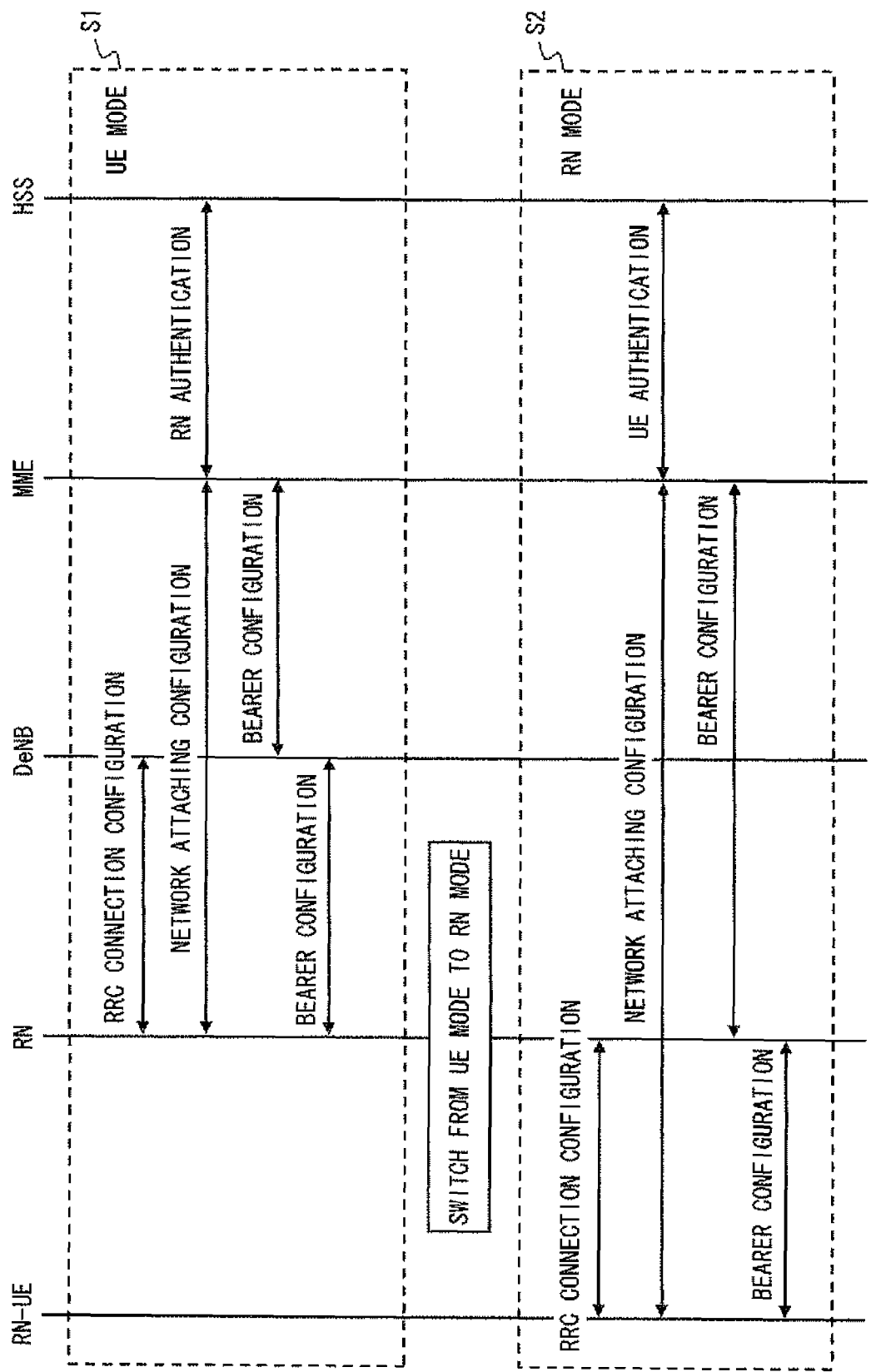
FIG. 2 is a diagram showing a sequence when an RN attaches to a DeNB according to the background art.

Hereinafter, embodiments of the present invention will be described in detail with reference to the drawings. In the drawings, the same elements are denoted by the same reference numerals, and a repeated explanation is omitted as needed for clarity of the explanation.

First Embodiment

In a first embodiment, an RN temporarily attaches to an eNB and notifies an upper network apparatus, such as an OAM server, of a state of attaching configuration information. The notification of the state, for example, includes (i) information indicating a correspondence relation between a donor base station designated by the attaching configuration information and a currently attaching base station, (ii) information indicating whether valid attaching configuration information is held or not, or (iii) a request for new attaching configuration information.

Figure 3:
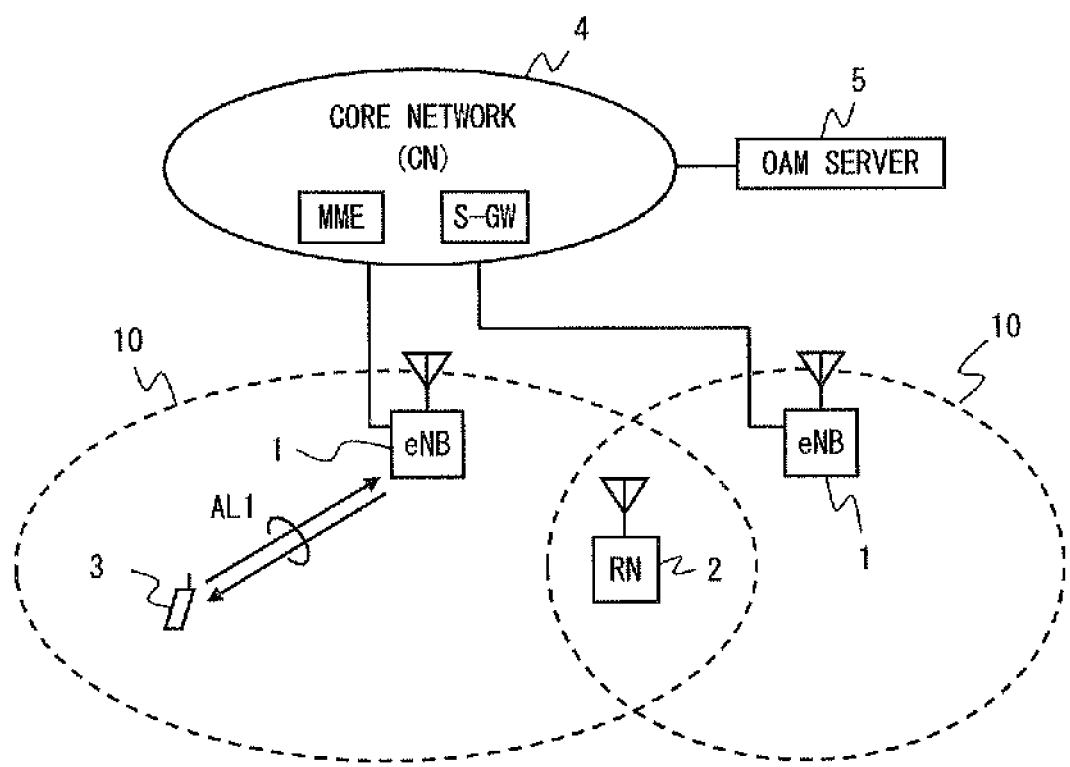
FIG. 3 is a block diagram showing a configuration of a mobile communication system according to first to fifth embodiments.

FIG. 3 is a diagram showing a configuration example of a radio communication system including a base station 1, a relay station 2, a mobile station 3, and a core network 4 according to this embodiment. This embodiment will be described assuming that the radio communication system is an FDD (Frequency division Duplex)-OFDMA, more specifically, a radio communication system of LTE-Advanced based on LTE. The base station 1 belongs to the core network 4 of a mobile communication network operator, and relays traffic between the mobile station 3 and the core network 4. The base station 1 is able to accommodate the relay station 2, and also the mobile station 3.

Figure 4:
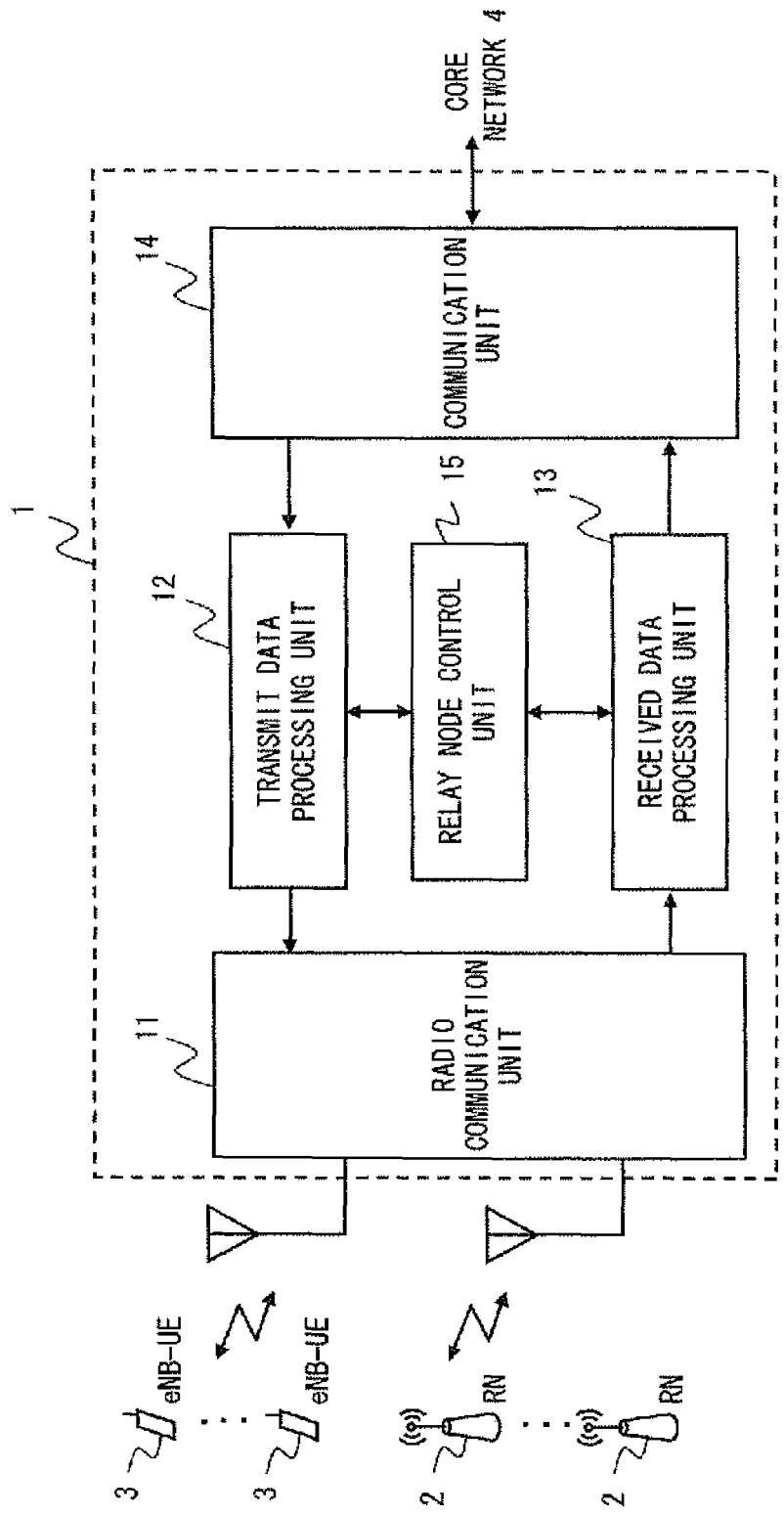
FIG. 4 is a block diagram showing a configuration example of a base station 1.

FIG. 4 is a block diagram showing a configuration example of the base station 1. Referring to FIG. 4, a radio communication unit 11 generates a downlink signal by performing processing, such as mapping onto resource elements, OFDM signal generation (IDFT: Inverse Discrete Fourier Transform), frequency conversion, and signal amplification, on a transmission symbol sequence of a physical channel supplied from a transmit data processing unit 12. The generated downlink signal is wirelessly transmitted from an antenna. The radio communication unit 11 receives an uplink signal transmitted from the mobile station 3 or the relay station 2, and restores a reception symbol sequence.

The transmit data processing unit 12 stores the data for the mobile station 3 or the relay station 2, which is acquired from a communication unit 14, in buffers set for each mobile station and for each bearer, and generates a transport channel by performing error correction coding, rate matching, interleaving, or the like. Further, the transmit data processing unit 12 adds control information to data sequence of the transport channel to generate a radio frame. Furthermore, the transmit data processing unit 12 generates a transmission symbol sequence for each physical channel by performing scrambling and modulation symbol mapping on the data sequence of the radio frame.

A received data processing unit 13 restores the received data for each logical channel from the reception symbol sequence supplied from the radio communication unit 11. User traffic data included in the obtained received data and a part of control data are transferred to the core network 4 via the communication unit 14.

A relay node control unit 15 controls the transmission timing and radio resource allocation related to the data to be transmitted to the mobile station 3 and the relay station 2. Further, the relay node control unit 15 receives information indicating whether to support an RN operation (corresponding to an RN mode), which is notified from the relay station 2, via the received data processing unit 13. The relay node control unit 15 performs configuration of a backhaul link according to whether the relay station 2 supports the RN operation.

Figure 5:
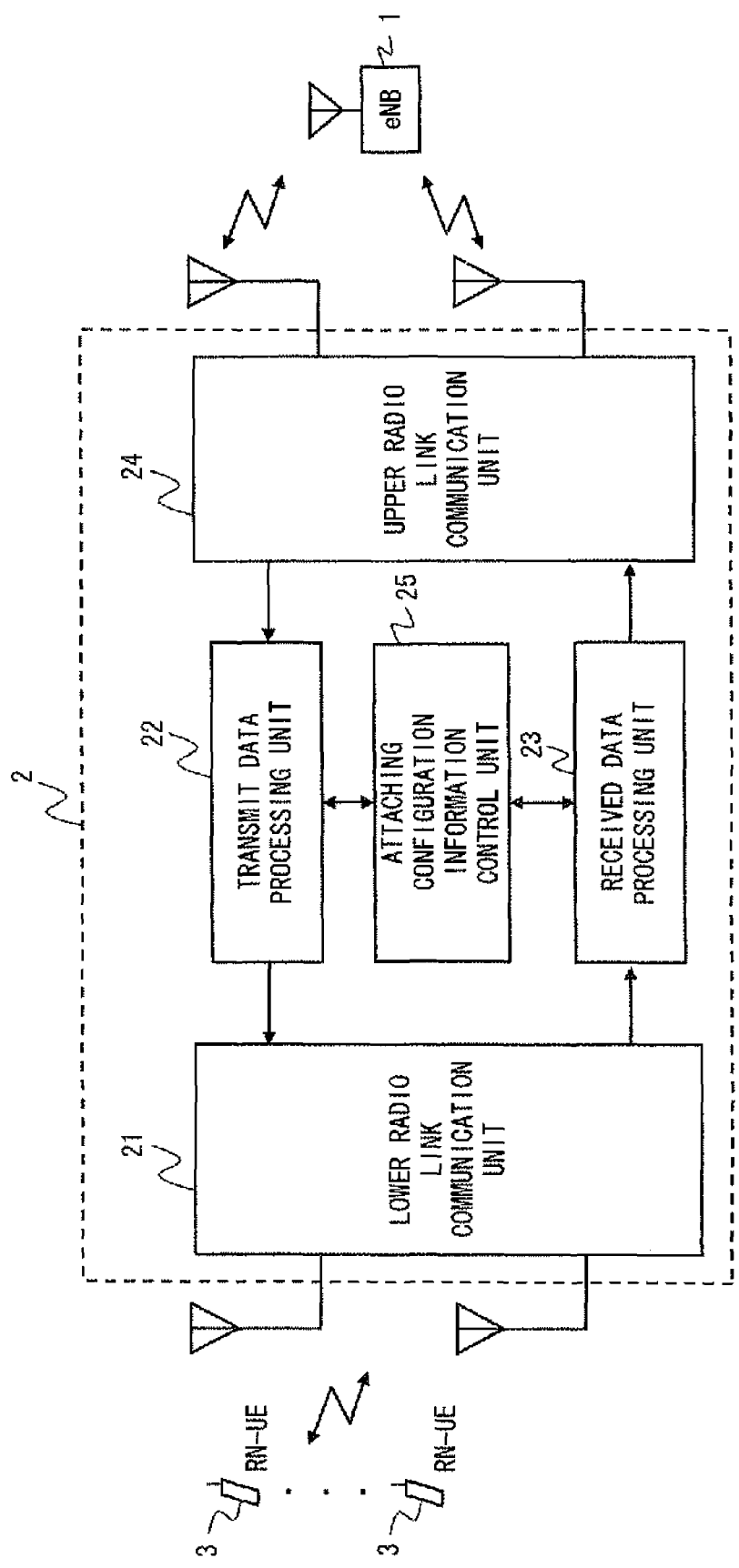
FIG. 5 is a block diagram showing a configuration example of a relay station 2.

FIG. 5 is a block diagram showing a configuration example of the relay station 2. The relay station 2 has a function equivalent to the base station 1, unless explicitly specified otherwise. Referring to FIG. 5, a lower radio link communication unit 21 receives the uplink signal transmitted from the mobile station 3 via the antenna. A received data processing unit 23 has a function equivalent to the received data unit 13 of the base station 1, and the obtained received data is transmitted to the base station 1 via an upper radio link communication unit 24. A transmit data processing unit 22 has a function equivalent to the transmit data processing unit 12 of the base station 1, and generates a transmission symbol sequence from the transmit data which is acquired from the upper radio link communication unit 24 and transmitted to the mobile station 3. The lower radio link communication unit 21 generates a downlink signal from the symbol sequence and transmits the downlink signal to the mobile station 3.

An attaching configuration information control unit 25 controls the attaching configuration information related to the base station 1. The attaching configuration information control unit 25 receives the attaching configuration information from the base station 1 or the core network 4 via the upper radio link communication unit 24 and the transmit data processing unit 22. Specifically, the attaching configuration information control unit 25 notifies an OAM server 5 of the state of the attaching configuration information. For example, the attaching configuration information control unit 25 determines validity of the attaching configuration information based on whether information (a frequency of a DeNB cell, a Physical Cell ID (PCI), or the like) of the base station to which the relay station 2 actually attaches matches information on a donor base station, a cell, or a sector which is designated by predetermined attaching configuration information and to which the relay station should attach. The attaching configuration information control unit 25 notifies the OAM server 5 of the determination result. The notification of this case may include information indicating whether the attaching configuration information is correct or not. The notification of this case may include information capable of determining whether the base station to which the relay station actually attaches corresponds to the donor base station to which the relay station should attach.

For example, the attaching configuration information control unit 25 may notify the OAM server 5 that the relay station 2 does not hold the attaching configuration information. The notification of this case may include information capable of determining that the relay station 2 does not hold the attaching configuration information. The notification of this case may also include a request message of new attaching configuration information. For example, when the relay station 2 holds the attaching configuration information but the attaching configuration information is unavailable due to expiration or the like, the attaching configuration information control unit 25 may notify the OAM server 5 that the available attaching configuration information is not held. The notification of this case may include information capable of determining that the relay station 2 does not hold the available attaching configuration information.

Figure 6:
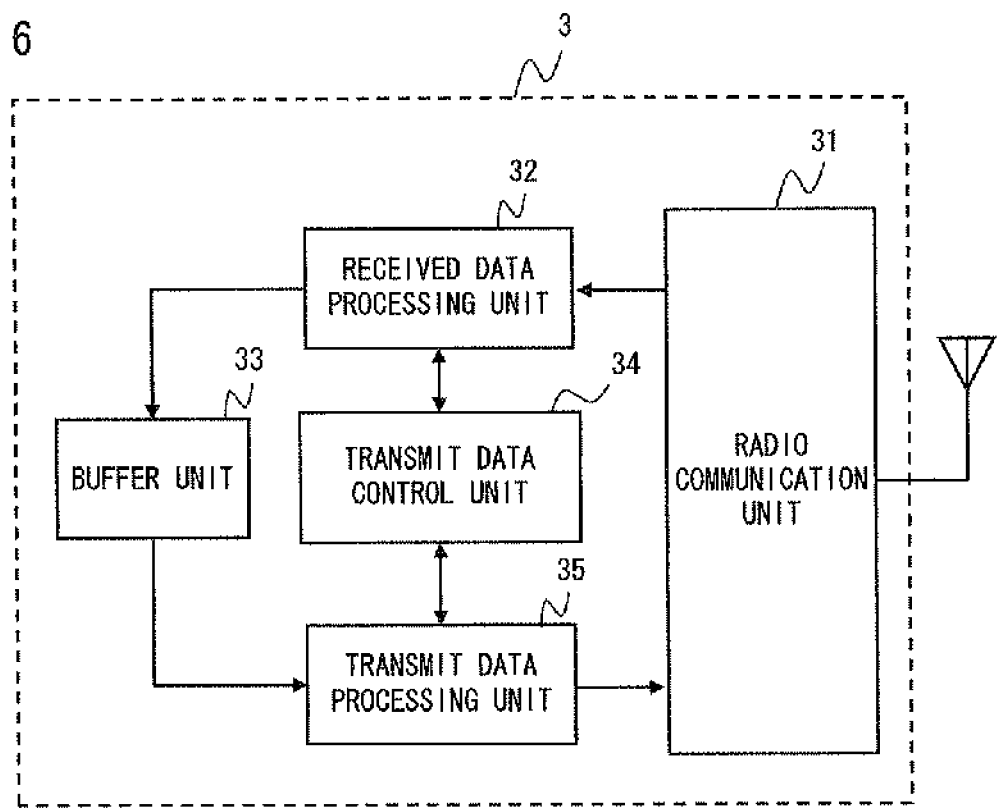
FIG. 6 is a block diagram showing a configuration example of a mobile station 3.

FIG. 6 is a block diagram showing a configuration example of the mobile station 3. A radio communication unit 31 receives a downlink signal via an antenna. A received data processing unit 32 sends received data restored from the received downlink signal to a buffer unit 35. The received data stored in the buffer unit 35 is read out and used depending on the purpose thereof. A transmit data control unit 33, a transmit data processing unit 34, and the radio communication unit 31 generate an uplink signal by using the transmit data stored in the buffer unit 35, and transmit the signal to the base station 1 or the relay station 2.

Figure 7:
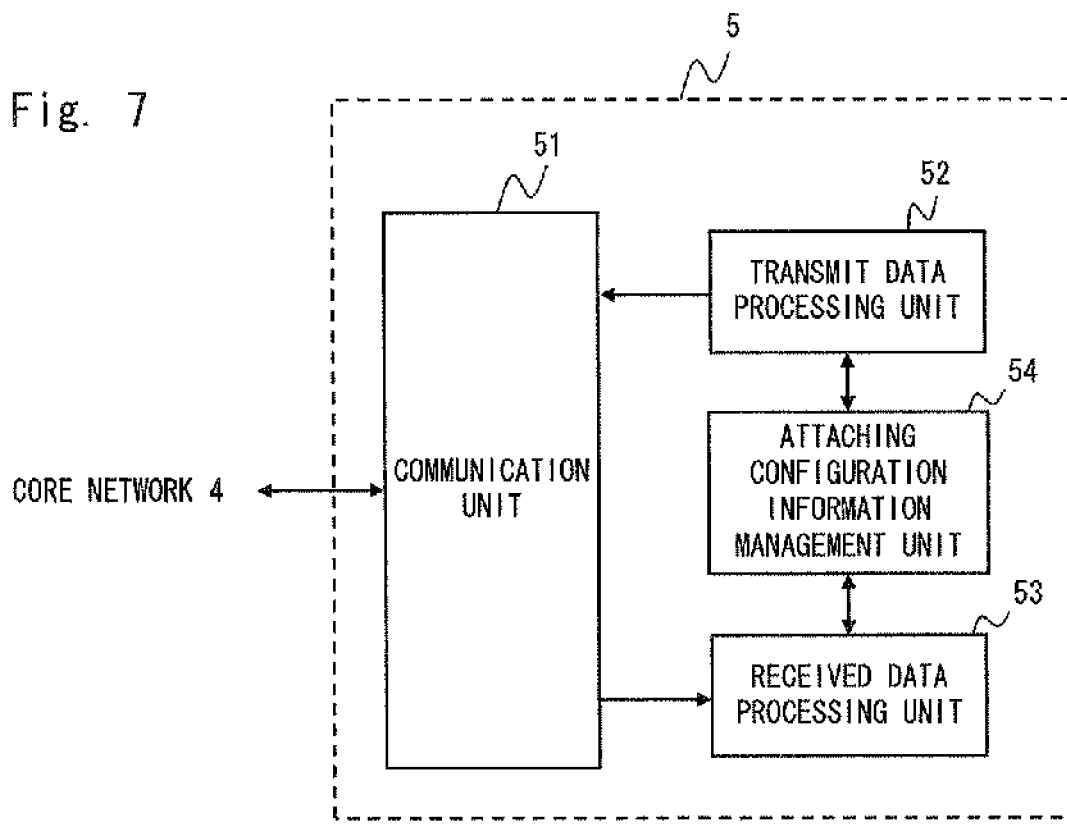
FIG. 7 is a block diagram showing a configuration example of an OAM server 5.

FIG. 7 is a block diagram showing a configuration example of the OAM server 5. The OAM server 5 includes a communication unit 51 that performs communication with the core network 4, a transmit data processing unit 52, a received data control unit 53, and an attaching configuration information management unit 54. The received data processing unit 53 receives data transmitted from the relay station 2. When the received data includes a notification as to the state of the attaching configuration information of the relay station 2 or a request of attaching configuration information, the received data is transferred to the attaching configuration information management unit 54. The attaching configuration information management unit 54 judges whether or not to notify the relay station 2 of the attaching configuration information, and sends the attaching configuration information from the transmit data processing unit 52 to the relay station 2 based on the judgment result.

Subsequently, a specific example of a procedure for notifying the state of the attaching configuration information according to the first embodiment will be described with reference to FIGS. 8 to 10.

Figure 8:
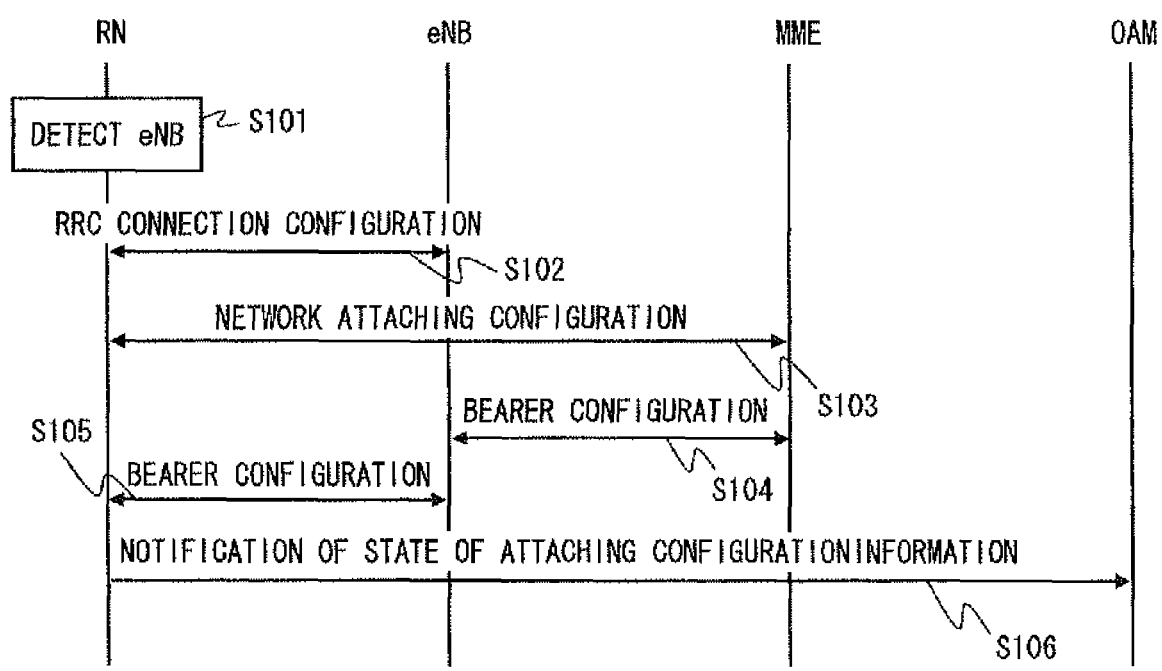
FIG. 8 is a sequence diagram showing an example of a procedure for notifying a state of attaching configuration information in the first embodiment of the invention.

FIG. 8 is a sequence diagram showing an example of a procedure for notifying the state of the attaching configuration information according to the first embodiment. FIG. 8 shows interactions among the OAM server 5, the core network 4, the base station 1, and the relay station 2. In FIG. 8, "OAM" corresponds to the OAM server 5; "MME" corresponds to the core network 4; "DeNB" corresponds to the base station 1; and "RN" corresponds to the relay station 2.

In step S101, the RN searches for the eNB to which the RN attaches, and performs configuring an RRC connection to the detected eNB (step S102). After configuring the RRC connection, the RN performs network attaching procedure to the core network with the MME (step S103), and shifts to processing of bearer setup with the MME (step S104). In step S104, a bearer setup procedure is performed between the MME and the eNB. In step S105, a bearer setup procedure is performed between the eNB and the RN. After completion of the processing of steps S104 and S105, the RN can communicate with the OAM. The RN that can communicate with the OAM notifies the OAM of the state of the attaching configuration information (step S106).

Figure 9:
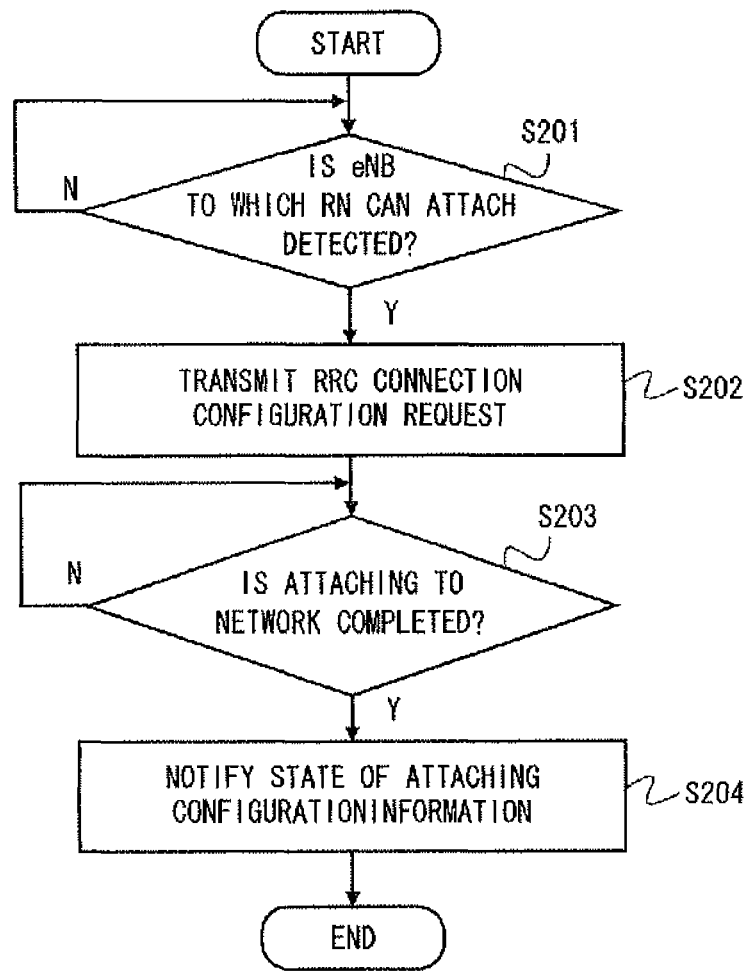
FIG. 9 is a flowchart of the relay station 2 in the first embodiment of the invention.

FIG. 9 is a flowchart related to the operation when the RN attaches to the network and notifies the OAM of the state of the attaching configuration information in the first embodiment. The operation shown in FIG. 9 is started by searching for the eNB to which the RN can attach.

In step S201, when the eNB to which the RN can attach can be detected (Yes in step S201), the RN transmits an RRC connection configuration request to the detected eNB (step S202), and the process shifts to step S203. When the eNB to which the RN can attach cannot be detected (No in step S201), the RN terminates the operation without notifying the OAM of the state of the attaching configuration information. In step S203, is the RN judges whether the RN has completed the attaching to the network. When the RN has completed the attaching to the network (Yes in step S203), the RN notifies the OAM of the state of the attaching configuration information (step S204), and terminates the operation. When the attaching to the network is not completed (No in step S203), the RN returns to step S203 to judge again whether the attaching to the network has been completed or not.

Figure 10:
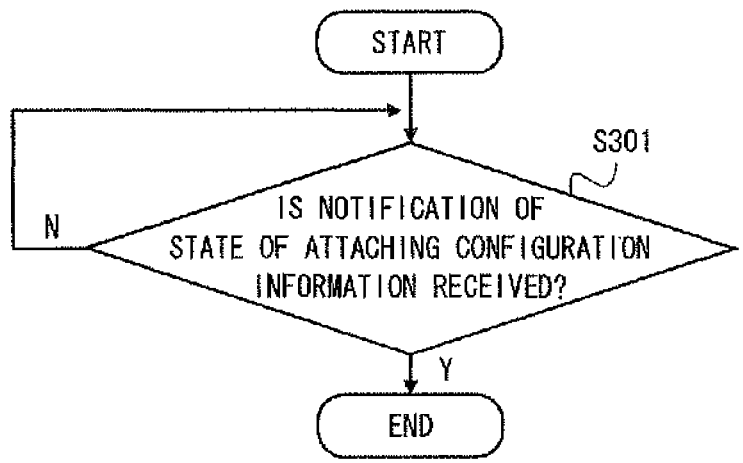
FIG. 10 is a flowchart of the OAM server 5 in the first, second, and fifth embodiments of the invention.

FIG. 10 is a flowchart related to the operation in which the OAM receives a notification of the state of the attaching configuration information in the first embodiment. In step S301, the OAM judges whether to receive the notification of the state of the attaching configuration information. When the OAM has received the notification of the state of the attaching configuration information (Yes in step S301), the OAM terminates the reception operation. When the OAM has not received the notification of the state of the attaching configuration information (No in step S301), the OAM returns to step S301 again to judge whether the notification is received or not.

The operations of the base station 1 and the mobile station 3 are similar to typical operations, so the description thereof is omitted.

As described above, the relay station 2 according to this embodiment notifies the OAM server 5 of the state of the attaching configuration information after the attaching to the network via the base station 1. This allows a communication network operator to judge whether the contents of the attaching configuration information are appropriate or not, without the need to go to the installed location of the relay station 2, and to easily perform the setting of the attaching configuration information, such as a correction of a mismatch in the attaching configuration information or a change into correct contents. Moreover, the communication network operator can expect a reduction in installation operation cost due to simplification of the setting of the attaching configuration information.

Second Embodiment

In a second embodiment, when the relay station 2 cannot attach to the DeNB designated by the attaching configuration information, the relay station 2 attaches to another eNB and notifies the OAM of a validity of the attaching configuration information. A valid state of the attaching configuration information corresponds to the case where the relay station 2 can normally attach to the donor base station designated by the held attaching configuration information. On the other hand, an invalid state of the attaching configuration information corresponds to the case where the relay station 2 cannot normally attach to the donor base station designated by the held attaching configuration information. Specific examples of the case where the relay station cannot normally attach to the DeNB designated by the attaching configuration information (in other words, the attaching is unsuccessful) include the case where the DeNB designated by the attaching configuration information is not present in the vicinity of the relay station 2, and the case where the attaching to the DeNB designated by the attaching configuration information is rejected. The notification of the validity of the attaching configuration information may include information indicating whether the attaching configuration information is valid or not, or information indicating that the attaching to the DeNB designated by the attaching configuration information is unsuccessful. The notification may also include information capable of determining whether the base station to which the relay station actually attaches corresponds to the donor base station to which the relay station should attach.

A specific example of a procedure for notifying the validity of the attaching configuration information in the second embodiment will be described below with reference to FIGS. 11A, 11B, and 12.

Figure 11A:
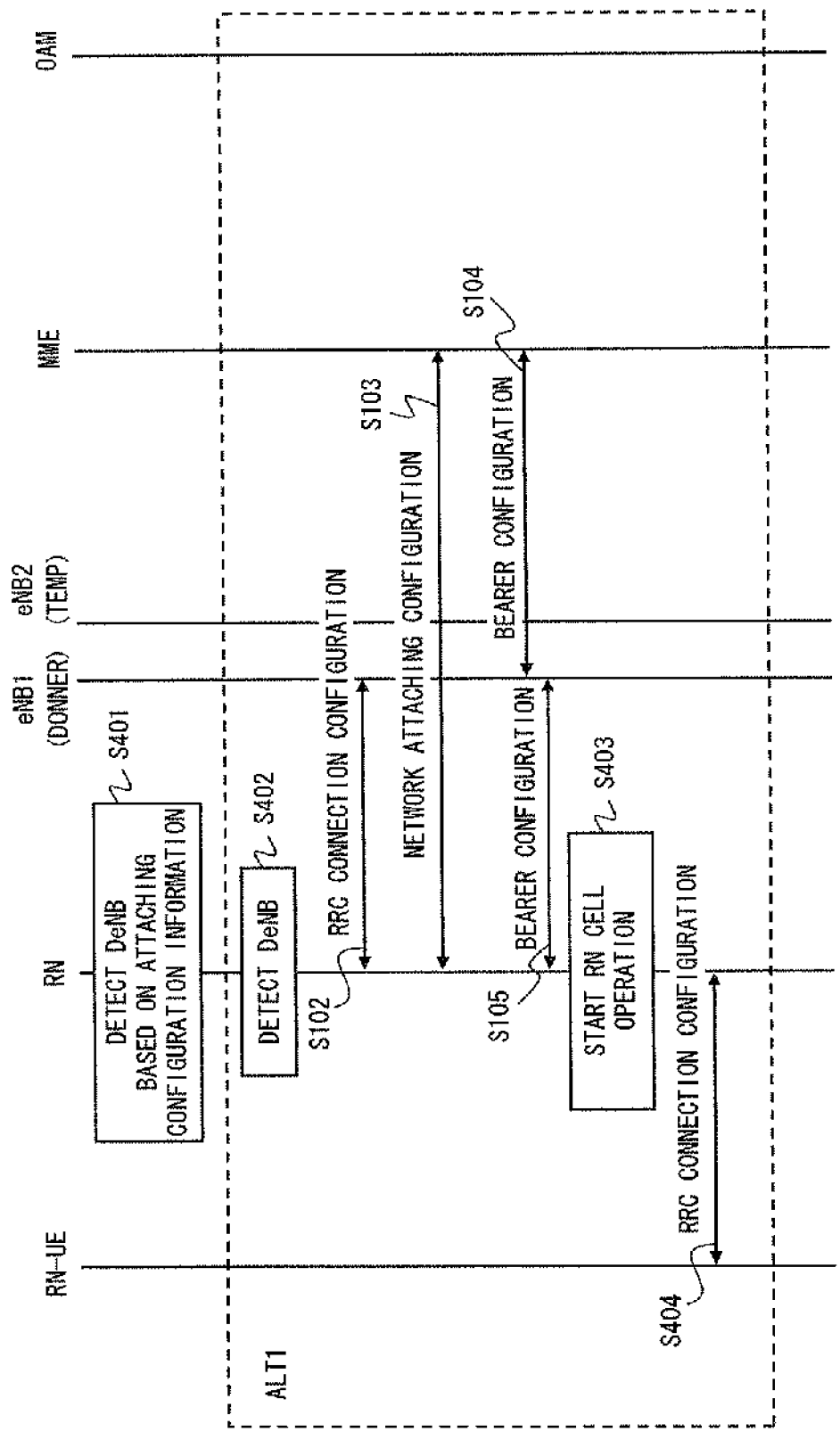
FIG. 11A is a sequence diagram showing an example of a procedure for notifying a state (validity) of attaching configuration information in the second embodiment of the invention.
Figure 11B:
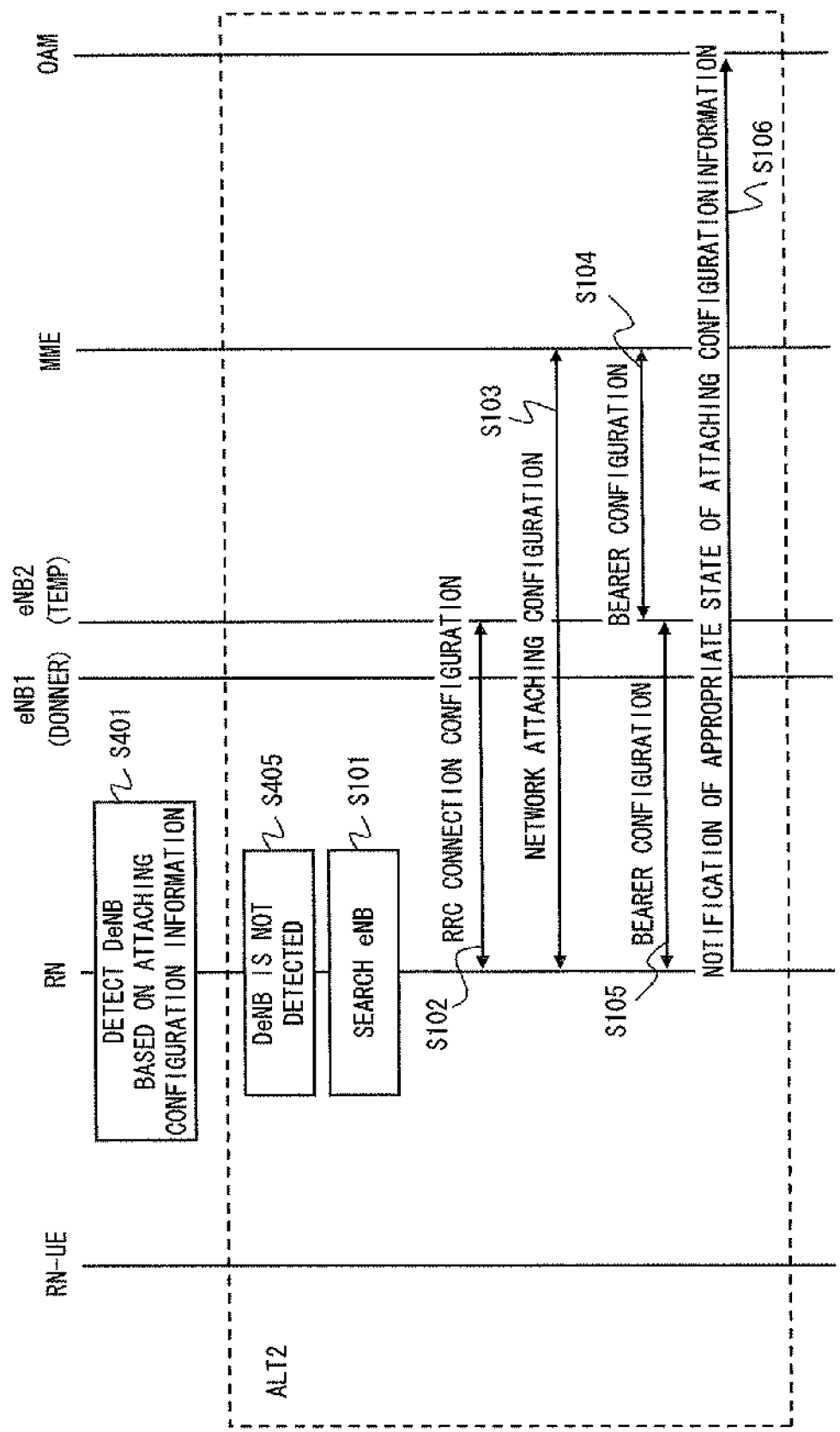
FIG. 11B is a sequence diagram showing an example of a procedure for notifying a state (validity) of attaching configuration information in the second embodiment of the invention.

FIGS. 11A and 11B are sequence diagrams showing an example of the procedure for notifying the validity of the attaching configuration information in the second embodiment. In FIGS. 11A and 11B, "eNB 1" corresponds to a base station that is described in the attaching configuration information, "eNB 2" corresponds to a base station that is not described in the attaching configuration information, "RN" corresponds to the relay station 2, "OAM" corresponds to the OAM server 5, and "MME" corresponds to the core network 4. The RN can detect the eNB 2 by searching. In step S401, the RN judges whether the eNB 1 can be detected or not based on the attaching configuration information. When the eNB 1 has been detected, the operations of steps S402, S102 to S105, and S403 to S404 (Alt1 in FIG. 11A) are carried out. When the eNB 1 has not been detected, the operations of steps S405 and S101 to S106 (A1t2 in FIG. 11B) are carried out.

When the RN has detected the eNB 1 based on the attaching configuration information in step S402, the RN transmits the RRC connection configuration request to the detected eNB, and attaches to the network. Steps S102 to S105 showing the series of operations are similar to those of the first embodiment, so the detailed description thereof is omitted. Upon completion of the attaching to the network, the RN starts the operation of an RN cell (step S403) and starts accepting an attach request from an RN-UE (step S404).

When the RN has not detected the eNB 1 based on the attaching configuration information in step S405, the RN searches for an eNB to which the RN can attach, transmits the RRC connection configuration request to the detected eNB 2, and performs the operation to notify the OAM of the validity of the attaching configuration information. Steps S101 to S106 showing the series of operations are similar to those of the first embodiment, so the detailed description thereof is omitted.

Figure 12:
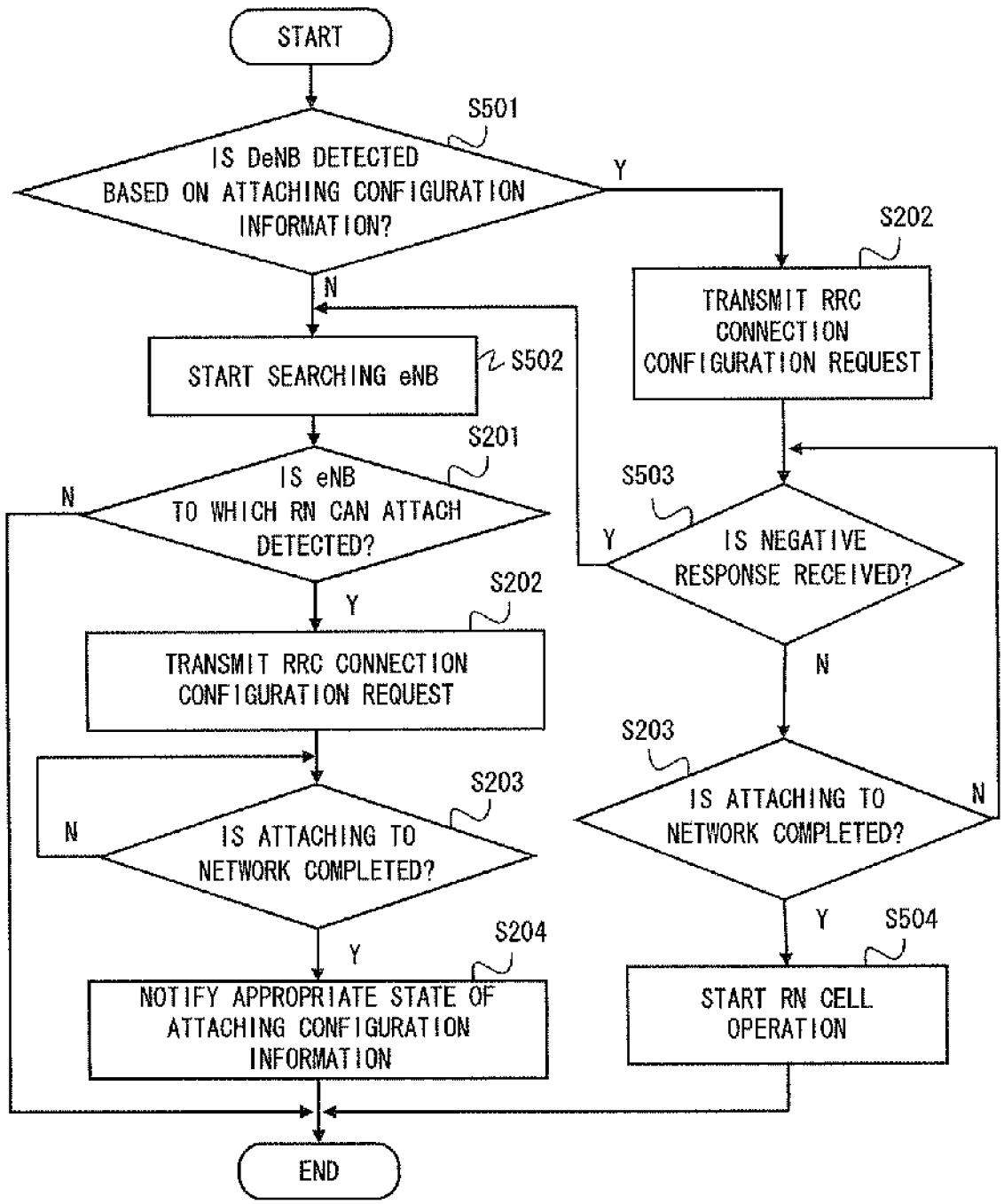
FIG. 12 is a flowchart of the relay station 2 in the second embodiment of the invention.

FIG. 12 is a flowchart related to the operation in which the relay station 2 attaches to the network and notifies the OAM of the validity of the attaching configuration information in the second embodiment. In response to the operation to detect the DeNB based on the held attaching configuration information, the relay station 2 starts processing illustrated in the flowchart of FIG. 12. In step S501, the relay station 2 judges whether the DeNB can be detected or not based on the held attaching configuration information. When the DeNB has been detected based on the attaching configuration information (Yes in step S501), the relay station 2 configures the RRC connection to the detected DeNB, and attaches to the network. After transmission of the RRC connection request (step S202), it is determined whether the response to the RRC connection request is a negative response or not (step S503). When the response to the RRC connection request is a negative response (Yes in step S503), the process proceeds to step S502 which is described later. When the response to the RRC connection request is a positive response (No in step S503), it is determined whether the attaching to the network has been completed or not (step S203).

When the RN has not completed the attaching to the network (No in step S203), the process returns to step S503 again to determine the response to the RRC connection request. After the attaching to the network (Yes in step S203), the relay station 2 starts the operation of the RN cell (step S504). When the DeNB has not been detected based on the attaching configuration information (No in step S501) or when a negative response has been received (Yes in step S503), the relay station 2 starts detection of another eNB which is different from the eNB designated in the attaching configuration information (step S502). After that, the relay station 2 judges the detection result, configures the RRC connection to the detected eNB, and notifies the OAM server of the validity information of the attaching configuration information after the attaching to the network. Steps S201 to S204 showing these series of operations are similar to those of the first embodiment, so the detailed description thereof is omitted.

A flowchart related to the operation in which the OAM server 5 receives the notification of the validity of the attaching configuration information in this embodiment is similar to that of the first embodiment, so the detailed description is omitted. Further, the operations of the base station 1 and the mobile station 3 are similar to typical operations, as with the first embodiment, so the description thereof is omitted.

As described above, when the relay station 2 according to this embodiment cannot find the base station to which the relay station should attach based on the attaching configuration information, the relay station 2 attaches to the network via another base station which is different from the base station designated by the attaching configuration information, and notifies the OAM server 5 of the validity of the attaching configuration information. Accordingly, even when the DeNB setting is erroneously made in the attaching configuration information preliminarily set to the relay station 2, the OAM server 5 can find the error without the need for the operator to directly go to the installed location of the relay station 2. This allows a communication network operator to judge whether the contents of the attaching configuration information are appropriate or not and to easily perform the setting of the attaching configuration information, such as a correction of a mismatch in the attaching configuration information or a change into correct contents.

Third Embodiment

In a third embodiment, when the relay station 2 does not hold the attaching configuration information, the relay station 2 temporarily attaches to a base station which is detected by searching and to which the relay station can attach. Then, the relay station 2 notifies the OAM server 5 of information indicating that the attaching configuration information is not held, or of a request for the attaching configuration information, and acquires the attaching configuration information from the OAM server 5. Further, the relay station 2 re-attaches to the DeNB based on the newly obtained attaching configuration information.

Figure 13:
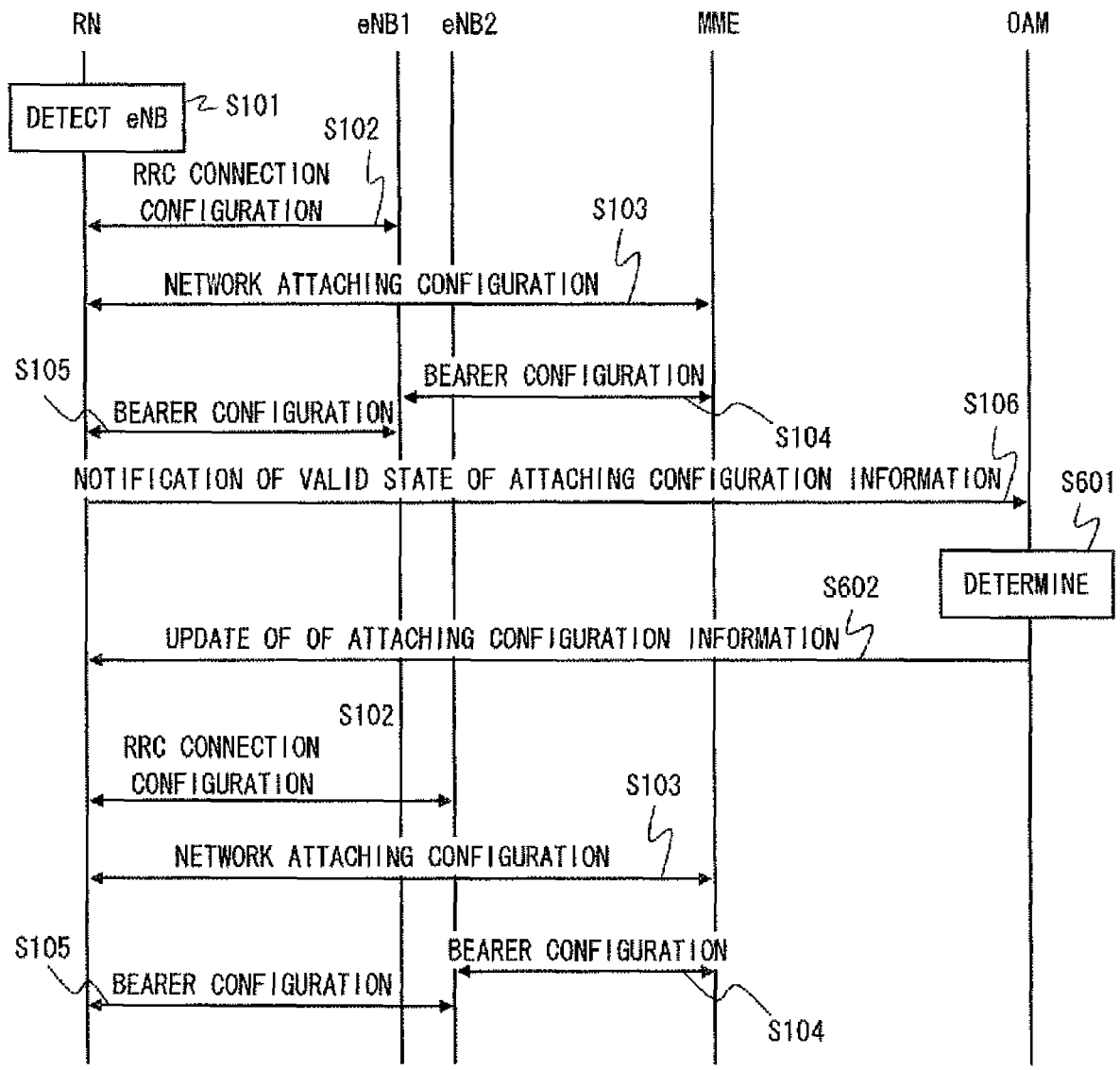
FIG. 13 is a sequence diagram showing an example of a procedure for notifying a state (availability) of attaching configuration information in the third embodiment of the invention.

A specific example of a procedure for notifying the state (i.e., availability) of the attaching configuration information in the third embodiment will be described below with reference to FIGS. 13 to 15. FIG. 13 is a sequence diagram showing an example of a procedure for notifying the availability of the attaching configuration information in the third embodiment. In FIG. 13, "eNB 1" corresponds to a base station which is detected by searching and to which the relay station can attach, "eNB 2" corresponds to a base station described in the updated attaching configuration information, "RN" corresponds to the relay station 2, "OAM" corresponds to the OAM server 5, and "MME" corresponds to the core network 4.

In FIG. 13, steps S101 to S106 are similar to those of the first embodiment, so only the differences will be described. After receiving the notification as to the availability of the attaching configuration information from the RN, the OAM determines the attaching configuration information to be set to the RN (step S601), and sends it to the RN (step S602). The RN re-attaches to the network based on the attaching configuration information. The series of operations are similar to steps S102 to S105 of the first embodiment, so the description thereof is omitted.

Figure 14:
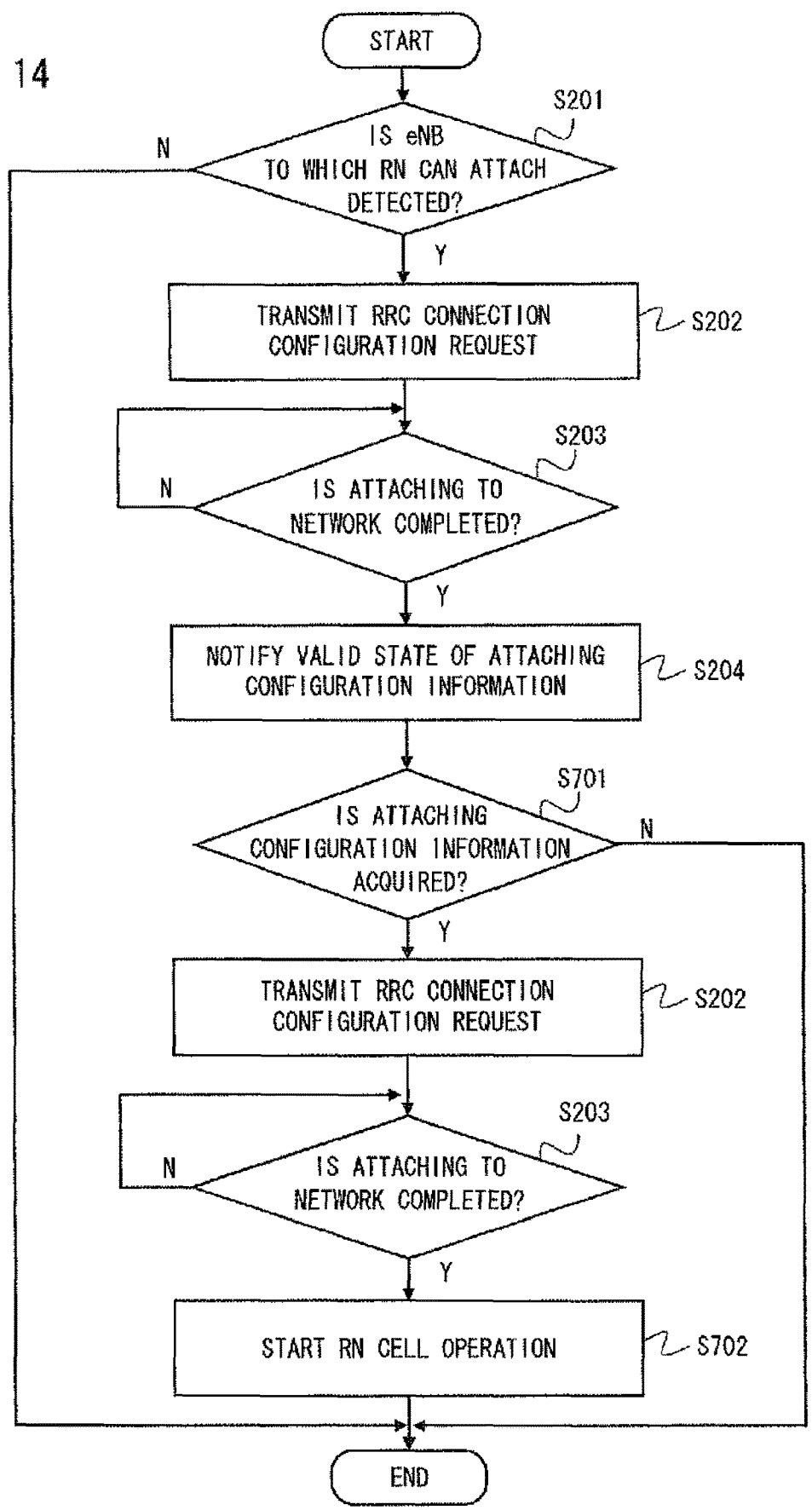
FIG. 14 is a flowchart of the relay station 2 in the third embodiment of the invention.

FIG. 14 is a flowchart related to the operation in which the relay station 2 that does not hold the available attaching configuration information attaches to the network, notifies the OAM server 5 of the availability of the attaching configuration information, and acquires the attaching configuration information in the third embodiment. Steps S201 to S204 are similar to those of the first embodiment, so only the differences will be described. In step S204, after notifying the OAM server 5 of the availability of the attaching configuration information, the relay station 2 shifts to step S701 to determine the reception of the attaching configuration information. Examples of the notification of the availability of the attaching configuration information may include a notification indicating that the available attaching configuration information is not held, a notification of information on the base station temporarily connected, and a notification for requesting new attaching configuration information.

When the attaching configuration information is received from the OAM server 5 in step S701 (Yes in step S701), the relay station 2 configures the RRC connection to the new DeNB based on the newly obtained attaching configuration information, and performs the operation of attaching to the network. The series of operation steps S202 to S203 are similar to those of the first embodiment, so the detailed description thereof is omitted. After the attaching to the network, the relay station 2 starts the operation of the RN cell (step S702), and terminates the operation. When the attaching configuration information is not received from the OAM server 5 (No in step S701), the relay station 2 terminates the operation.

Figure 15:
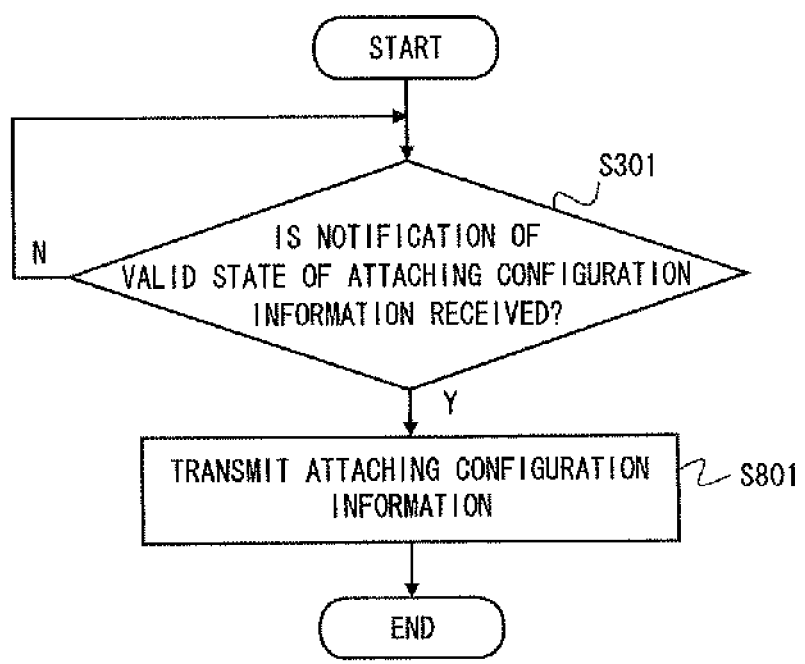
FIG. 15 is a flowchart of the OAM server 5 in the third and fourth embodiments of the invention.

FIG. 15 is a flowchart related to the operation in which the OAM server 5 receives the notification of the availability of the attaching configuration information and sends the attaching configuration information to the RN in the third embodiment. Step S301 is similar to that of the first embodiment, so only the differences will be described. When the notification as to the availability of the attaching configuration information is received from the relay station 2 (Yes in step S301), the OAM server 5 determines the attaching configuration information to be set to the relay station 2, sends it to the relay station 2 (step S801), and terminates the operation.

The operations of the base station 1 and the mobile station 3 are similar to typical operations, as with the first embodiment, so the description thereof is omitted.

As described above, the relay station 2 according to this embodiment acquires the updated attaching configuration information from the OAM server after the establishment of the attaching to the network via the base station. Then, the base station 2 re-attaches to the base station based on the updated attaching configuration information. Accordingly, there is no need to preliminarily set the attaching configuration information to the relay station 2. This makes it possible to easily set the attaching configuration information to the relay station 2 and to reduce the man-hour required for an installer. As a result, the communication network operator can expect a reduction in installation operation cost.

Fourth Embodiment

In a fourth embodiment, when the relay station 2 cannot attach to the DeNB based on attaching configuration information, the relay station 2 temporarily attaches to another eNB and acquires the updated attaching configuration information from the OAM server 5. Then, the relay station 2 re-attaches to the DeNB based on the updated attaching configuration information.

Figure 16A:
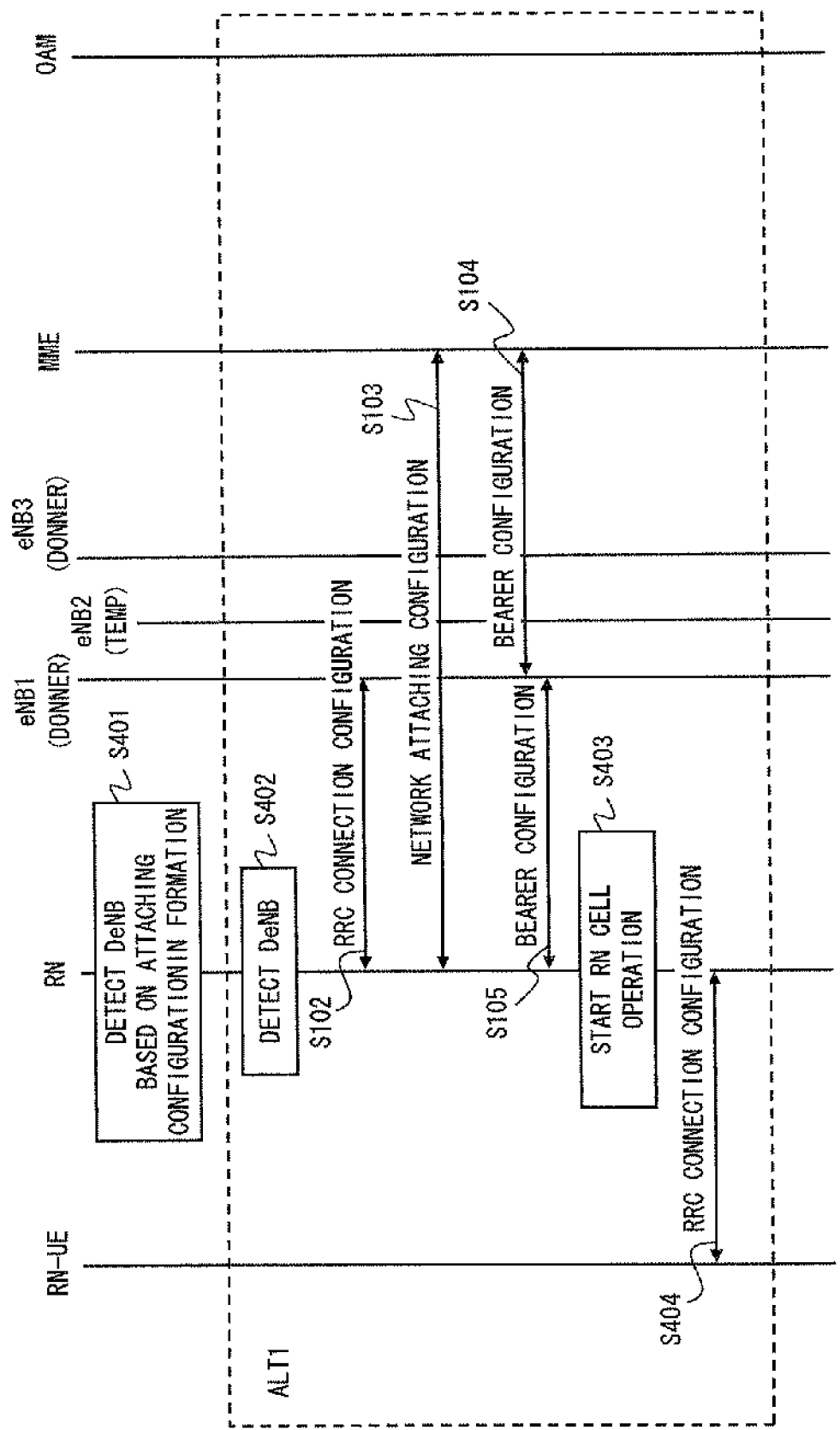
FIG. 16A is a sequence diagram showing an example of a procedure for notifying a state of attaching configuration information in the fourth embodiment of the invention.
Figure 16B:
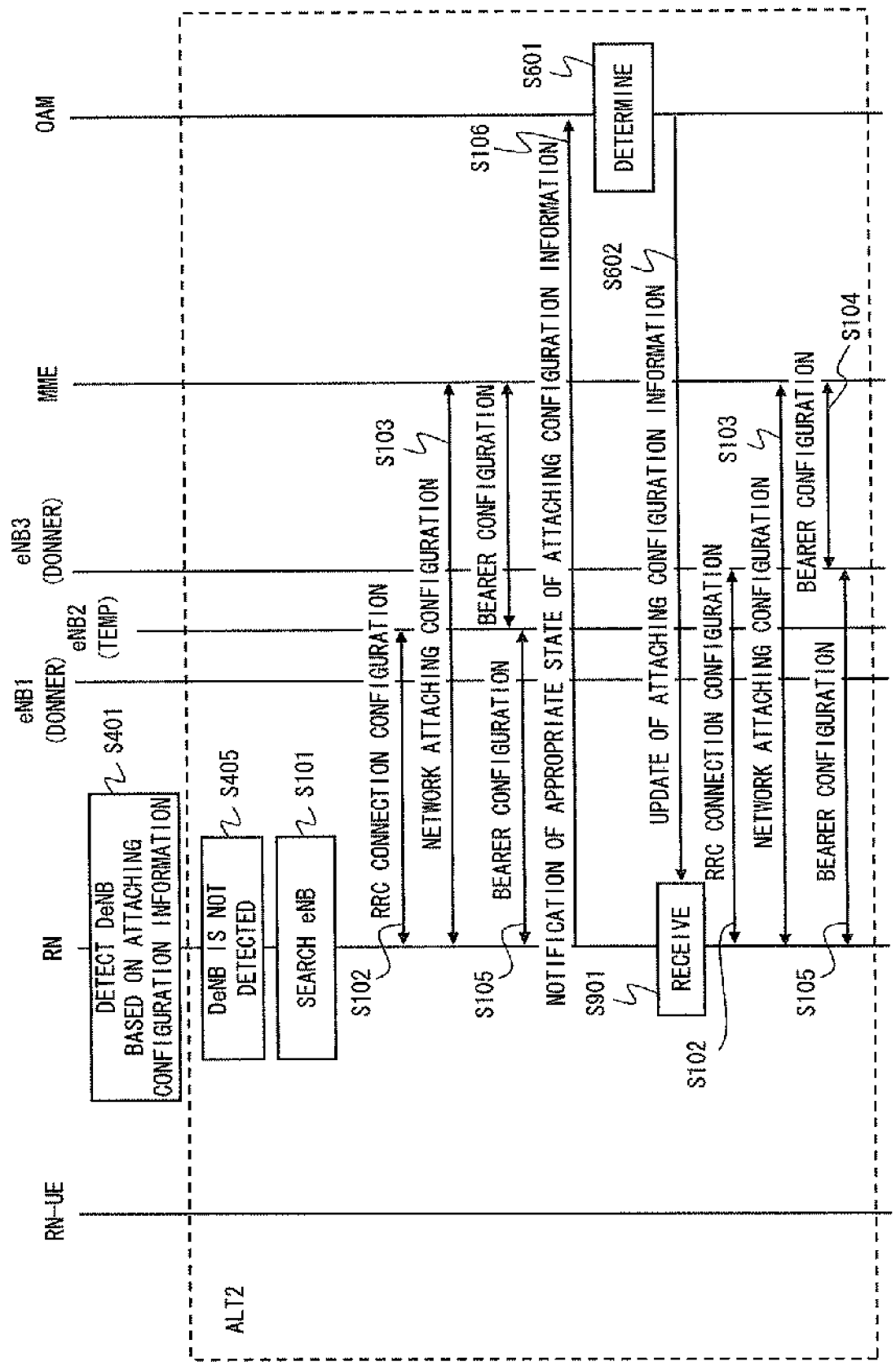
FIG. 16B is a sequence diagram showing an example of a procedure for notifying a state of attaching configuration information in the fourth embodiment of the invention.

A specific example of a procedure for notifying the validity of the attaching configuration information in the fourth embodiment will be described below with reference to FIGS. 16A, 16B, and 17. FIGS. 16A and 16B are sequence diagrams showing an example of a procedure for notifying the validity of the attaching configuration information in the fourth embodiment. In FIGS. 16A and 16B, "eNB 1" corresponds to a base station described in the attaching configuration information before updating; "eNB 2" corresponds to a base station which is not described in the attaching configuration information and is detected by searching and to which the relay station can attach; "eNB 3" corresponds to a base station described in the updated attaching configuration information; "RN" corresponds to the relay station 2; "OAM" corresponds to the OAM server 5; and "MME" corresponds to the core network 4. The RN can detect the eNB 2 by searching.

Steps S101 to S106, S401 to S405, and S601 to S602 are similar to those of the first, second, or third embodiment, so only the differences will be described. The RN receives the attaching configuration information in step S901 of FIG. 16B, configures the RRC connection to the eNB 3 based on the received attaching configuration information, and re-attaches to the network.

Figure 17:
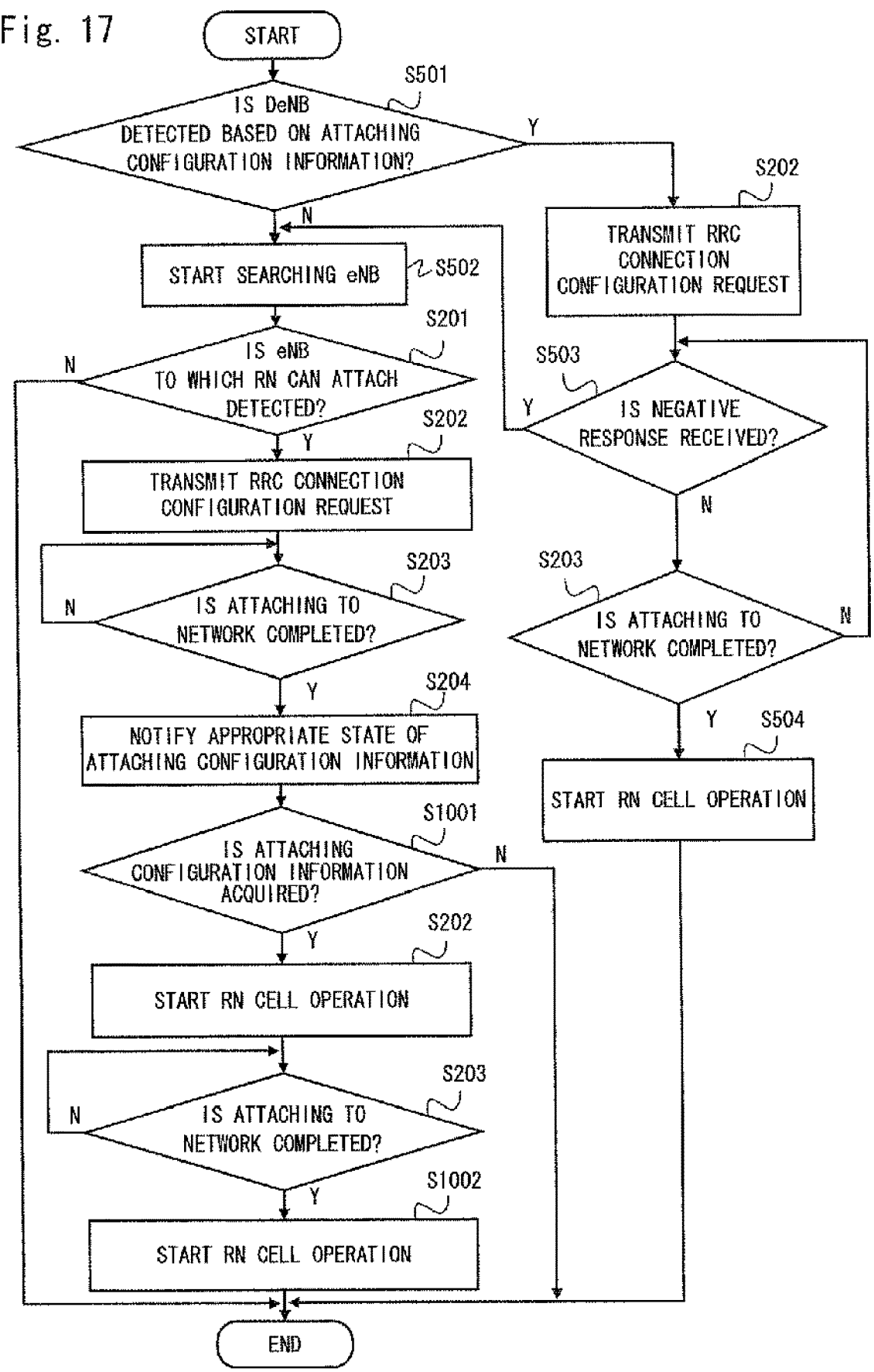
FIG. 17 is a flowchart of the relay station 2 in the fourth embodiment of the invention.

FIG. 17 is a flowchart related to the operation in which when the relay station 2 cannot attach to the DeNB based on the attaching configuration information, the relay station 2 attaches to another eNB which is different from the eNB described in the attaching configuration information, and the OAM server 5 updates the attaching configuration information in the fourth embodiment. The relay station 2 starts processing illustrated in the flowchart of FIG. 17 in response to the operation of detecting the DeNB based on the held attaching configuration information. Steps S201 to S204 and S501 to S504 are similar to those of the first embodiment or the second embodiment, so only the differences will be described.

In step S204, the relay station 2 notifies the OAM server 5 of the validity of the attaching configuration information, and shifts to step S1001 to judge whether the updated attaching configuration information is received or not. When the updated attaching configuration information is received (Yes in step S1001), the relay station 2 configures the RRC connection to the DeNB based on the attaching configuration information (step S202). After the attaching to the network, the relay station 2 starts the operation of the RN cell (step S1002), and terminates the operation. On the other hand, when the updated attaching configuration information is not received (No in step S1001), the relay station 2 returns to step S1001 to judge whether the updated attaching configuration information is received or not.

A flowchart related to the operation in which the OAM server 5 receives the notification as to the validity of the attaching configuration information is similar to that of the third embodiment, so the detailed description thereof is omitted. The operations of the base station 1 and the mobile station 3 are similar to typical operations, as with the first embodiment, so the description is omitted.

As described above, the relay station 2 according to this embodiment searches for a base station to which the relay station can attach, based on the preliminarily set attaching configuration information. When the base station cannot be detected, the relay station attaches to the network via another base station, and acquires the updated attaching configuration information from the OAM server. The relay station 2 according to this embodiment performs the attaching operation again based on the updated attaching configuration information, and attaches to the base station described in the attaching configuration information. Accordingly, even when the setting of the base station is erroneously made in the preliminarily set attaching configuration information, the man-hour required for the installer to update the attaching configuration information held by the relay station 2 can be reduced and the updating can be facilitated. As a result, the communication network operator can expect a reduction in installation operation cost.

Fifth Embodiment

In a fifth embodiment, when the RN attaches to the DeNB based on the attaching configuration information, the RN notifies the DeNB of an indication indicating the RN mode is supported. When the RN temporarily attaches to the eNB, the RN does not notify the DeNB of the indication indicating that the RN mode is supported.

A specific example of a procedure for notifying the validity of the attaching configuration information in the fifth embodiment will be described below with reference to FIGS. 18A, 18B, and 19.

Figure 18A:
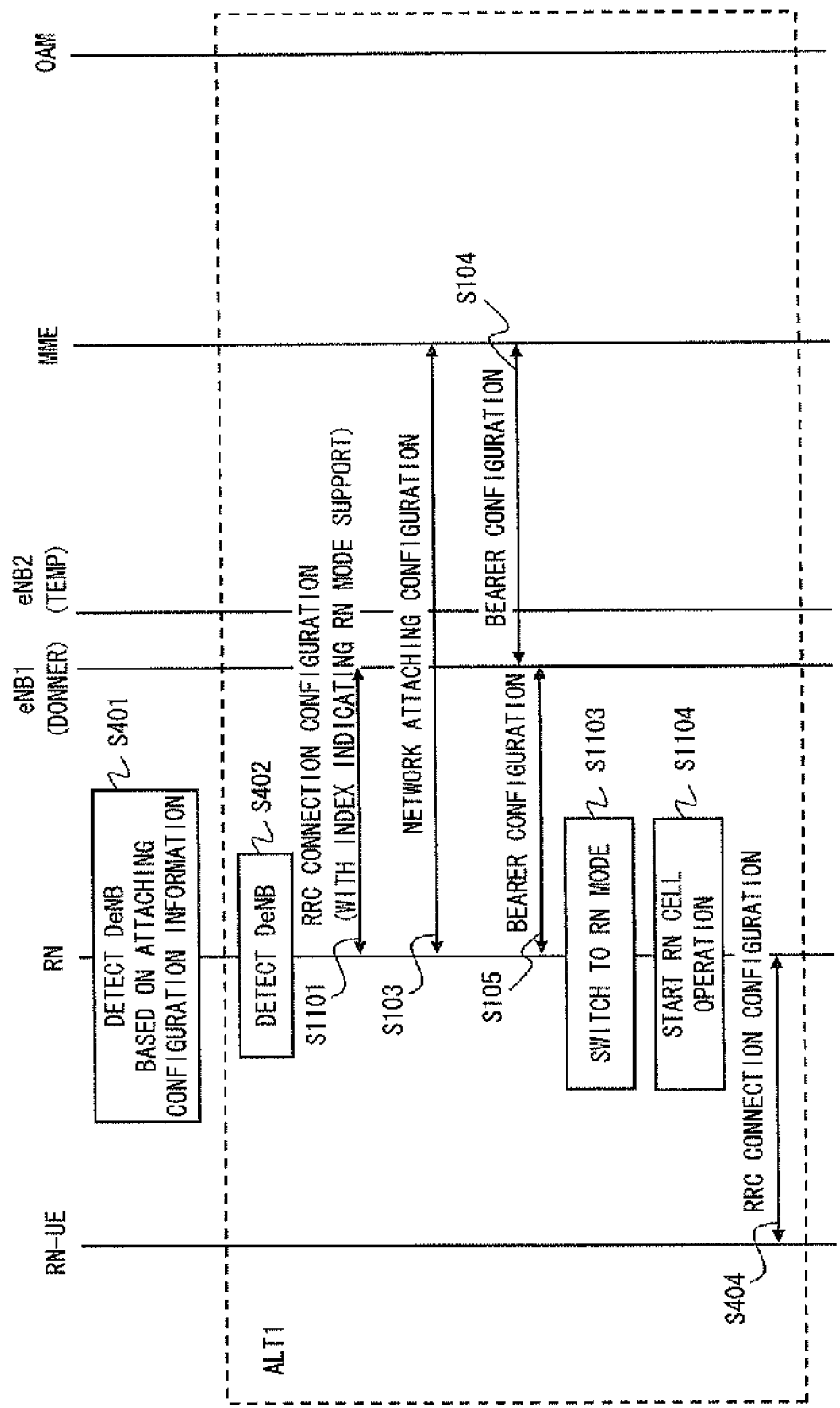
FIG. 18A is a sequence diagram showing an example of a procedure for notifying a state of attaching configuration information in the fifth embodiment of the invention.
Figure 18B:
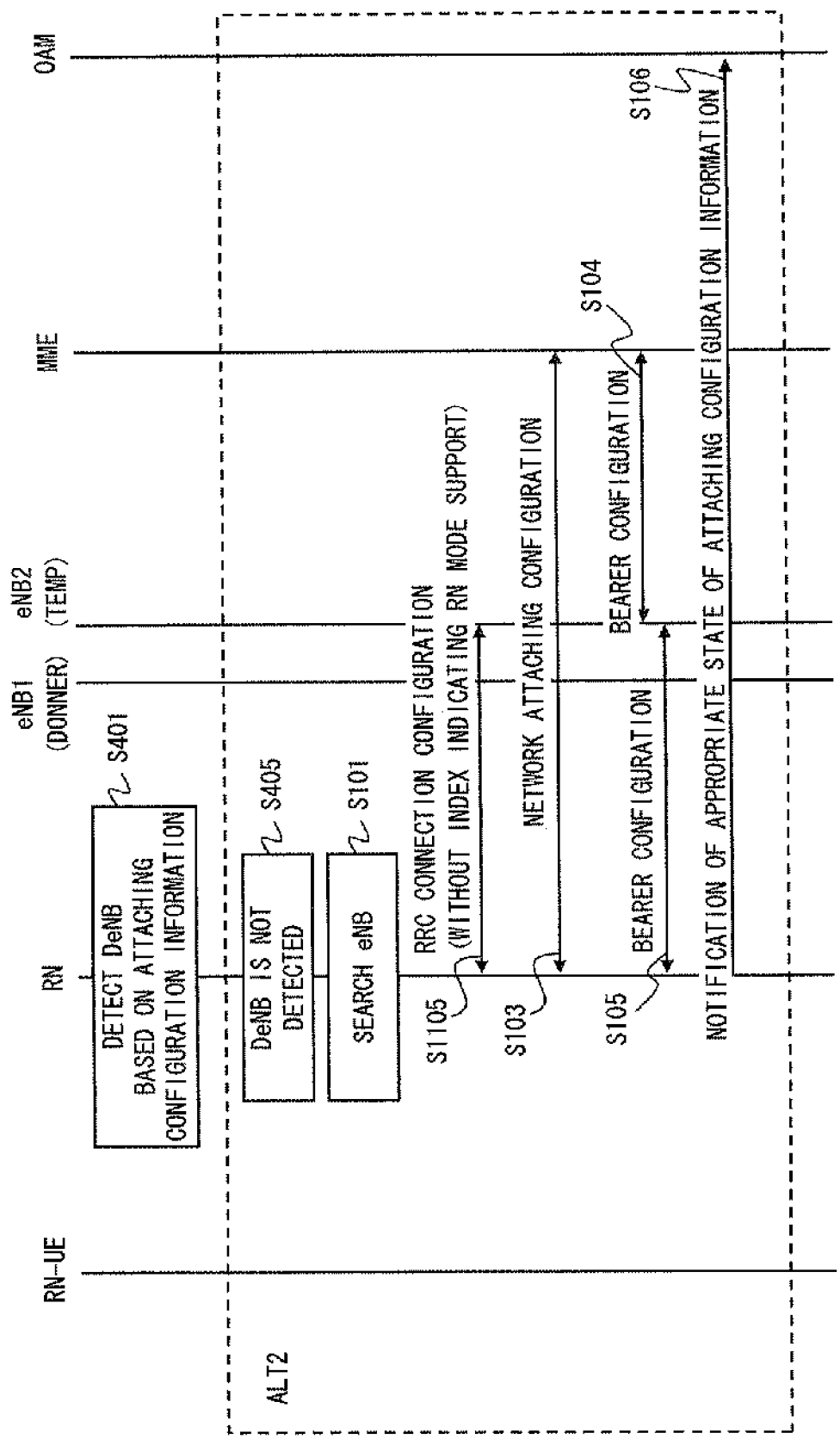
FIG. 18B is a sequence diagram showing an example of a procedure for notifying a state of attaching configuration information in the fifth embodiment of the invention.

FIGS. 18A and 18B are sequence diagrams showing an example of a procedure for notifying the validity of the attaching configuration information in the fifth embodiment. In FIGS. 18A and 18B, "eNB 1" corresponds to a base station described in the attaching configuration information; "eNB 2" corresponds to a base station that is not described in the attaching configuration information; and "RN" corresponds to the relay station 2. The RN can detect the eNB 2 by searching.

Steps S101 to S106 and S401 to S405 are similar to those of the first embodiment or the second embodiment, so only the differences will be described. In step S1101, the RN configures the RRC connection to the detected eNB 1 based on the attaching configuration information. At this time, the message to configure the RRC connection includes the indication indicating that the RN mode is supported. After completion of the process for the RN to attach to the network, the eNB 1 configures a backhaul link (step S1102), and the RN is switched from the UE mode to the RN mode (step S1103) and starts the operation of the RN cell (step S104). In step S1105, the RN configures the RRC connection to the eNB 2 which is different from the eNB 1 designated in the attaching configuration information. At this time, the RN does not include, to the message, the indication indicating that the RN mode is supported.

FIG. 19 is a flowchart related to the operation of notifying the indication indicating that the RN mode is supported, in the process in which the relay station 2 according to the fifth embodiment attaches to the network. Steps S201 to S204 and S501 to S504 are similar to those of the first embodiment or the second embodiment, so only the differences will be described.

In step S1201, the relay station 2 sends a message to configure the RRC connection, which does not include the indication indicating that the RN mode is supported, in order to temporarily connect to an eNB other than the DeNB designated in the attaching configuration information. On the other hand, in step S1202, the relay station 2 sends a message to configure the RRC connection, which includes the indication indicating that the RN mode is supported, to the DeNB designated in the attaching configuration information, and shifts to S1203 to judge whether backhaul link configuration information is received or not, after the completion of the attaching to the network. When the backhaul link configuration information is received (Yes in step S1203), the relay station 2 starts the operation of the RN cell (step S503). When the backhaul link configuration information is not received (No in step S1203), the relay station 2 returns to step S1203 to judge whether the backhaul link configuration information is received or not.

Figure 20:
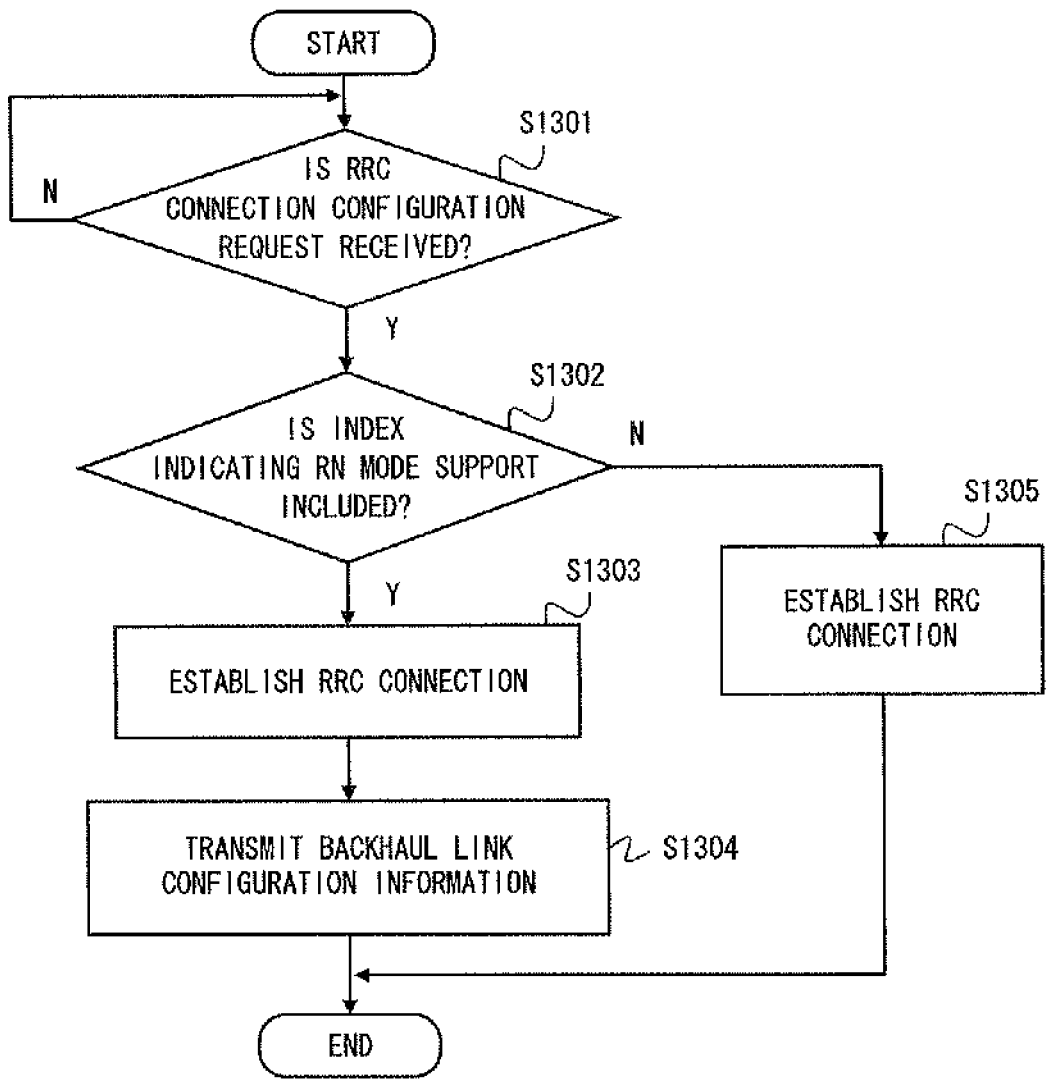
FIG. 20 is a flowchart of the base station 1 in the fifth embodiment of the invention.

FIG. 20 is a flowchart showing an example of the operation procedure of the base station 1 according to the fifth embodiment. Referring to FIG. 20, the base station 1 starts processing illustrated in the flowchart in response to the reception of the RRC connection configuration request from the relay station 2.

In step S1301, the base station 1 judges whether the RRC connection configuration request is received or not. When the RRC connection configuration request is received (Yes in step S1301), the base station 1 shifts to step S1302 to judge whether the RRC connection configuration request includes the indication indicating that the RN mode is supported. When the RRC connection configuration request is not received (No in step S1301), the base station 1 returns to step S1301 to judge whether the RRC connection configuration request is received or not. When the RRC connection configuration request received by the base station 1 includes the indication indicating that the RN mode is supported (Yes in step S1302), the base station 1 sets the RRC connection to the relay station 2 (step S1303), notifies the relay station 2 of the backhaul link configuration information (step S1304), and terminates the operation. In step S1302, when the indication indicating that the RN mode is supported is not included in the RRC connection configuration request (No in step S1302), the base station 1 sets the RRC connection to the relay station 2 (step S1305) and terminates the operation.

A flowchart related to the operation in which the OAM server 5 receives the notification as to the validity of the attaching configuration information is similar to that of the first embodiment, so the description thereof is omitted. The operations of the base station 1 and the mobile station 3 are similar to typical operations, as with the first embodiment, so the description thereof is omitted.

This embodiment illustrates an example in which the base station 1 judges whether the switching to the RN mode can be made or not, based on whether the relay station 2 includes the indication indicating that the RN mode is supported. However, the RN may send a different indication when the RN mode is not supported from the indication indicating that the RN mode is supported.

The description of the above-mentioned embodiments is made based on the second embodiment. However, even when the embodiments are based on an embodiment other than the second embodiment, the same effects can be obtained.

As described above, when the relay station 2 according to this embodiment can attach to the base station based on the preliminarily set attaching configuration information, the relay station 2 notifies the base station of the indication indicating that the RN mode is supported. On the other hand, when the relay station 2 cannot attach to the base station based on the attaching configuration information and attaches to another base station, the relay station 2 does not notify the base station of the indication indicating that the RN mode is supported. This enables the base station 1 to set a backhaul link only to the relay station 2 that starts the operation of the RN cell, thereby improving the use efficiency of the radio resource of the backhaul link.

Other Embodiment

In the case of E-UTRAN (LTE), the relay station 2 (hereinafter "relay node") may use one of the following two cell selection procedures.
(1) Temporal Cell Selection This procedure requires no attaching configuration information (hereinafter "donor cell information") in the relay node. The relay node scans all radio channels in the E-UTRA (Evolved-UMTS Terrestrial Radio Access) band by the function of each relay node for searching for an appropriate cell. Each relay node needs to search for only the cell that is strongest in each frequency carrier. When the appropriate cell is found, the cell is selected, the relay node notifies the E-UTRAN (Evolved-UMTS Terrestrial Radio Access Network) that the donor cell information is not held.
(2) Cell Selection Using the Held Donor Cell Information This procedure requires donor cell information obtained from previously configured donor cell information or previously downloaded donor cell information, and requires, as needed, information on a cell parameter. Once the relay node finds the appropriate cell, the relay node selects the cell. When no appropriate cell is found or when the relay station cannot attach to the selected cell, a temporal cell selection procedure is started.

The first to fifth embodiments of the invention described above have illustrated the case where the present invention is applied to the network that supports the RN of the LTE system. However, the application of the present invention is not limited to the base station that supports the RN of the LTE system. That is, the present invention can be applied to any case, as long as a relay station connected to a base station wirelessly or via a fixed line is provided and data transferred by the base station is terminated at the relay station.

Further, the processing related to the notification as to the state of the attaching configuration information by the relay station 2 described in the above-mentioned first to fifth embodiments of the invention may be implemented by causing a computer, such as a microprocessor, to execute one or more programs. This program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

The first to fifth embodiments of the invention can be arbitrarily combined. Further, the present invention is not limited to the embodiments described above, and can be modified in various manners without departing from the scope of the present invention described above.

This application is based upon and claims the benefit of priority from Japanese patent application No. 2010-174455, filed on Aug. 3, 2010, the disclosure of which is incorporated herein in its entirety by reference.

REFERENCE SIGNS LIST

1, 1-1, 1-2 BASE STATION
2 RELAY STATION
3 MOBILE STATION
4 CORE NETWORK
5 OAM SERVER
10 BASE STATION CELL (eNB CELL)
11 RADIO COMMUNICATION UNIT
12 TRANSMIT DATA PROCESSING UNIT
13 RECEIVED DATA PROCESSING UNIT
14 COMMUNICATION UNIT
15 RELAY NODE CONTROL UNIT
20 RELAY STATION CELL (RN CELL)
21 LOWER RADIO LINK COMMUNICATION UNIT
22 TRANSMIT DATA PROCESSING UNIT

23 RECEIVED DATA PROCESSING UNIT
24 UPPER RADIO LINK COMMUNICATION UNIT
25 ATTACHING CONFIGURATION INFORMATION CONTROL UNIT
31 RADIO COMMUNICATION UNIT
32 RECEIVED DATA PROCESSING UNIT
33 TRANSMIT DATA CONTROL UNIT
34 TRANSMIT DATA PROCESSING UNIT
35 BUFFER UNIT
51 COMMUNICATION UNIT
52 TRANSMIT DATA PROCESSING UNIT
53 RECEIVED DATA CONTROL UNIT
54 ATTACHING CONFIGURATION INFORMATION MANAGEMENT UNIT

The invention claimed is:

1. A relay node (RN) apparatus comprising:
a transmitter;
an RN operation unit; and
a receiver,
wherein in a first case where the RN is preconfigured to access a first DeNB, the transmitter sends first information related to a first RRC connection to the first DeNB, the first information including a first RN indication which makes the first DeNB perform a first relay configuration, and the RN operation unit starts an operation of a relay cell with the first DeNB after the first relay configuration is performed by the first DeNB; and
wherein in a second case where the RN does not have access information of a DeNB, the transmitter sends second information that does not include a second RN indication and is related to a second RRC connection to an eNB, a receiver receives from the eNB a third information indicating a second DeNB to access, the transmitter sends fourth information related to a third RRC connection to the second DeNB, the fourth information including the second RN indication which makes the second DeNB perform a second relay configuration, and the RN operation unit starts an operation of the relay cell with the second DeNB after the second relay configuration is performed by the second DeNB.

2. The RN apparatus according to claim 1, wherein in a third case where the RN is preconfigured to access the first DeNB but receives a negative response from the first DeNB, the transmitter sends the second information to the eNB, the receiver receives the third information from the eNB, the transmitter sends the fourth information, and the RN operation unit starts the operation of the relay cell with the second DeNB after the second relay configuration is performed by the second DeNB.

3. The RN apparatus according to claim 1, wherein in the first case the RN switches from a UE mode to an RN mode in response to the first DeNB performing the first relay configuration.

4. The RN apparatus according to claim 1, wherein in the second case the RN does not have access information of a DeNB and detects the eNB to which the RN can attach.

5. The RN apparatus according to claim 1, wherein in the second case, the RN temporarily attaches to the eNB and does not notify the eNB that an RN mode is supported.

6. A relay node (RN) apparatus comprising:
a transmitter;
an RN operation unit; and
a receiver,
wherein in a first case where the RN is preconfigured and able to access a first DeNB, the transmitter sends first information related to a first RRC connection to the first DeNB, the first information including a first RN indication which makes the first DeNB perform a first relay configuration, and the RN operation unit starts an operation of a relay cell with the first DeNB after the relay configuration is performed by the first DeNB; and
wherein in a second case where the RN is preconfigured and unable to access the first DeNB, the transmitter sends second information that does not include a second RN indication and is related to a second RRC connection to an eNB, a receiver receives from the eNB a third information indicating a second DeNB to access, the transmitter sends fourth information related to a third RRC connection to the second DeNB, the fourth information including the second RN indication which makes the second DeNB perform a second relay configuration, and the RN operation unit starts an operation of the relay cell with the second DeNB after the second relay configuration is performed by the second DeNB.

7. The RN apparatus according to claim 6, wherein in the second case the RN detects the eNB by search after being unable to access the first DeNB.

8. The RN apparatus according to claim 6, wherein the RN indication indicates that an RN mode is supported in order to temporarily connect to an eNB other than the first DeNB designated in attaching configuration information.

9. A relay node (RN) apparatus comprising:
a transmitter; and
a receiver,
wherein in a first case where the RN is able to connect with a first DeNB designated in attaching configuration information, the RN starts a first operation of a relay cell with the first DeNB after a first relay configuration is performed by the first DeNB; and
wherein in a second case where the RN is unable to connect with the first DeNB designated in the attaching configuration information, the transmitter sends information without an RN indication to an eNB to cause the eNB to send second attaching configuration information designating a second DeNB, and in response to the receiver receiving the second attaching configuration information, the transmitter sends information including the RN indication which makes the second DeNB perform a second relay configuration with the RN, and the RN starts a second operation of the relay cell with the second DeNB after the second relay configuration is performed by the second DeNB.

10. The RN apparatus according to claim 1, wherein the first relay configuration is for a first interface between the RN and the first DeNB, and the second relay configuration is for a second interface between the RN and the second DeNB.

* * * * *